US011098842B2

(12) United States Patent
Cardozo

(10) Patent No.: US 11,098,842 B2
(45) Date of Patent: *Aug. 24, 2021

(54) ADJUSTABLE MOUNT FOR A MOUNTABLE DEVICE

(71) Applicant: William Cardozo, Ketchum, ID (US)

(72) Inventor: William Cardozo, Ketchum, ID (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/506,692

(22) Filed: Jul. 9, 2019

(65) Prior Publication Data

US 2019/0331292 A1 Oct. 31, 2019

Related U.S. Application Data

(63) Continuation of application No. 15/382,349, filed on Dec. 16, 2016, now Pat. No. 10,344,914.

(Continued)

(51) Int. Cl.
*B23K 3/02* (2006.01)
*F16M 13/02* (2006.01)
(Continued)

(52) U.S. Cl.
CPC ............ *F16M 13/02* (2013.01); *F16H 19/04* (2013.01); *F16H 25/2015* (2013.01); *F16M 11/08* (2013.01); *F16M 11/10* (2013.01); *F16M 11/16* (2013.01); *F16M 11/18* (2013.01); *F16M 11/2014* (2013.01); *F16M 11/2085* (2013.01); *F16M 11/2092* (2013.01); *F16M 11/28* (2013.01); *F16H 2025/209* (2013.01); *F16H 2025/2084* (2013.01); *F16M 2200/024* (2013.01); *F16M 2200/028* (2013.01); *F16M 2200/06* (2013.01)

(58) Field of Classification Search
CPC .... F16M 13/02; F16M 11/2014; F16M 11/28; F16M 11/16; F16M 11/2092; F16M 11/18; F16M 11/10; F16M 11/2085; F16M 11/08; F16H 25/2015; F16H 19/04; F16H 2025/209; F16H 2025/2084; F15H 2200/028; F15H 2200/06; F15H 2200/024
USPC ....................................................... 29/281.5
See application file for complete search history.

(56) References Cited

U.S. PATENT DOCUMENTS 2,390,428 A 12/1945 Disse
3,897,637 A 8/1975 Genho
(Continued)

OTHER PUBLICATIONS

"545 Series Precision Sight Level", Brunson Instrument Company website; Retrieved from Brunson website on Apr. 10, 2017; As cited in parent application—U.S. Appl. No. 15/382,349 on an Information Disclosure Statement filed Apr. 13, 2017 (no website link provided in citation), 3 pages.

(Continued)

*Primary Examiner* — Lee D Wilson
*Assistant Examiner* — Donna Maynard
(74) *Attorney, Agent, or Firm* — Colby Nipper PLLC

(57) ABSTRACT

A mount assembly for a mountable device such as a laser unit, such as a hybrid point and line laser that projects a vertical plumb dot(s) up and down, combined with horizontal and plumb projected lines. The mount assembly including: a base, an X-axis linear actuator, an upright support, a Y-axis linear actuator, an extension arm, a Z-axis linear actuator, a support plate assembly, and a mount for mounting on the mountable device.

19 Claims, 23 Drawing Sheets

Related U.S. Application Data

(60) Provisional application No. 62/268,204, filed on Dec. 16, 2015.

(51) Int. Cl.

| | | |
|---|---|---|
| *F16H 19/04* | (2006.01) | |
| *F16M 11/20* | (2006.01) | |
| *F16M 11/28* | (2006.01) | |
| *F16M 11/16* | (2006.01) | |
| *F16M 11/18* | (2006.01) | |
| *F16M 11/10* | (2006.01) | |
| *F16M 11/08* | (2006.01) | |
| *F16H 25/20* | (2006.01) | |

(56) References Cited

U.S. PATENT DOCUMENTS

| | | | |
|---|---|---|---|
| 4,326,694 A * | 4/1982 | Destree | B25D 17/28 |
| | | | 211/182 |
| 4,852,265 A | 8/1989 | Rando et al. | |
| 5,144,487 A | 9/1992 | Hersey | |
| 5,307,368 A | 4/1994 | Hamar | |
| 5,331,395 A | 7/1994 | Piske et al. | |
| 5,547,330 A * | 8/1996 | Walimaa | F16M 11/043 |
| | | | 269/71 |
| 6,009,916 A * | 1/2000 | Krumm | D03C 7/04 |
| | | | 139/54 |
| 6,470,578 B1 | 10/2002 | Phuly et al. | |
| 6,763,595 B1 | 7/2004 | Hersey | |
| 7,096,591 B2 | 8/2006 | Glantz et al. | |
| 7,174,647 B2 | 2/2007 | Krantz et al. | |
| 7,196,798 B2 | 3/2007 | Tsai | |
| 7,213,343 B2 | 5/2007 | Glantz et al. | |
| 7,250,062 B2 | 7/2007 | Lemaire et al. | |
| 7,352,944 B2 | 4/2008 | Yang | |
| 8,222,559 B2 | 7/2012 | Chen et al. | |
| 8,605,274 B2 | 12/2013 | Schumacher | |
| 10,344,914 B2 | 7/2019 | Cardozo | |
| 2003/0101605 A1 | 6/2003 | Tacklind et al. | |
| 2003/0101606 A1 | 6/2003 | Li | |
| 2017/0182576 A1 * | 6/2017 | Teraoka | F16M 11/2014 |

OTHER PUBLICATIONS

"545-160 Series Multipurpose Precision Sight Level", Brunson Instrument Company website; Retrieved from Brunson website on Apr. 10, 2017; http://www.brunson.us/product/metrology-3d-measurement-optical-instruments-sight-levels-545-190-160-2/, 2 pages.

"545-190 Series Precision Sight Level", Brunson Instrument Company website; Retrieved from Brunson website on Apr. 10, 2017; http://www.brunson.us/producl/metrology-3d-measurement—Optical-instruments-sight-levels-545-190-160/, 1 page.

"802,802-3 Precision Lateral Slides", Brunson Instrument Company website; Retrieved from Brunson website on Apr. 10, 2017; http://www.brunson.us/producl/metrology-3d-measurement-lateral-slide-for-stands-802/, 1 page.

"Notice of Allowance", U.S. Appl. No. 15/382,249, filed Mar. 13, 2019, 8 pages.

"PLS480", Pacific Laser Systems website; Retrieved from Pacific Laser Systems website on Apr. 10, 2017; http://www.plslaser.com/products/pls-480, 3 pages.

"Universal Adapter", Pacific Laser Systems website; Retrieved from Pacific Laser Systems website on Apr. 10, 2017; http://www.plslaser.com/products/universal-adapter, 2 pages.

* cited by examiner

ADJUSTABLE MOUNT FOR A MOUNTABLE DEVICE

PRIORITY/CROSS-REFERENCE TO RELATED APPLICATIONS

This application is a continuation application of pending application Ser. No. 15/382,349, filed 16 Dec. 2016, which claimed the benefit of U.S. Provisional Application No. 62/268,204, filed 16 Dec. 2015, the disclosures of which are incorporated by reference.

TECHNICAL FIELD

Present invention relates to the field of general construction. More specifically, the present invention is used in conjunction with any of the commercially available self leveling plumb lasers or laser units having one or more lasers for projecting one or more laser beams therefrom.

BACKGROUND

The mountable device preferably includes an attaching nut (not illustrated) or other connector used to enable the mountable device to be connected with or to a support, such as a tripod. For example, many mountable devices, such as cameras and laser units, have an attaching nut sized to receive a ¼-20 (¼-inch major diameter, twenty (20) threads per inch)) screw. An exemplary mountable device is a laser unit, such as a hybrid point and line laser that projects a vertical plumb dot(s) up and down, combined with horizontal and plumb projected lines.

SUMMARY OF THE DISCLOSURE

Several exemplary mount assemblies are described herein.

An exemplary mount assembly comprises a mount assembly for a mountable device. The mountable device has a base, an X-axis linear actuator, an upright support, a Y-axis linear actuator, an extension arm, a Z-axis linear actuator, a support plate assembly, and a mount.

Another exemplary mount assembly comprises a mount assembly for a mountable device. The mount assembly has a base, an X-axis linear actuator, an upright support, a Y-axis linear actuator, an extension arm, a Z-axis linear actuator, a support plate assembly, and a mount. The base has a body portion which has a length defined between a left side and a right side. The body portion also has a bottom side configured for resting upon a surface, and a top side opposite thereto. The body portion defines a first mortise in the top side along the length, and the first mortise defines an X-axis. The X-axis linear actuator connects the body portion to the upright support. The X-axis linear actuator is for moving the extension arm leftward and rightward along the X-axis, resulting in an attached laser unit moving leftward and rightward along the X-axis. The upright support has an upper end and a lower end. The lower end of the upright support defines a first tenon configured for mating slidable engagement with the first mortise. The upper end of the upright support defines a second tenon. The second tenon is perpendicular to the first tenon. The second tenon defines a Y-axis. The Y-axis linear actuator connects the upright support to the extension arm. The Y-axis linear actuator is for moving the extension arm and support plate assembly in a forward direction and in a backward direction along the Y-axis. The extension arm has a truss and a vertical connector. The truss has a length. The truss has a top side and a bottom side. The truss defines a second mortise along the length on the bottom side. The second mortise is configured for mating slidable engagement with the second tenon of the upright support. The vertical connector defines a passageway through the extension arm. The passageway defines a Z-axis. The Z-axis is perpendicular to the X-Y axis directions. The vertical connector is configured for connecting with the support plate assembly. The Z-axis linear actuator connects the extension arm to the support plate assembly. The Z-axis linear actuator is for moving the support plate assembly in an upward direction and a downward direction along the Z-axis, resulting in an attached laser unit moving upwards and downwards along the Z-axis. The support plate assembly has a lifting screw and a support plate having a top side. The lifting screw is for supporting the support plate. The support plate is for supporting the device. The lifting screw connects to the Z-axis linear actuator. The mount has a top side and a bottom side. The top side has a platform for supporting the device, and the bottom side is configured for connection to the support plate.

Other exemplary mount assemblies are described herein.

Typical uses of such a mount assembly are anywhere mountable devices, such as laser units, are used in the field of construction. Specifically, for the layout of framing, cabinets, and interior details. The mount assembly is also highly useful inside of trailers, vehicles, airplane outfitting, and boats.

Additional understanding of the devices and methods contemplated and/or claimed by the inventor can be gained by reviewing the detailed description of exemplary devices, presented below, and the referenced drawings.

DEFINITIONS

Figure 1:
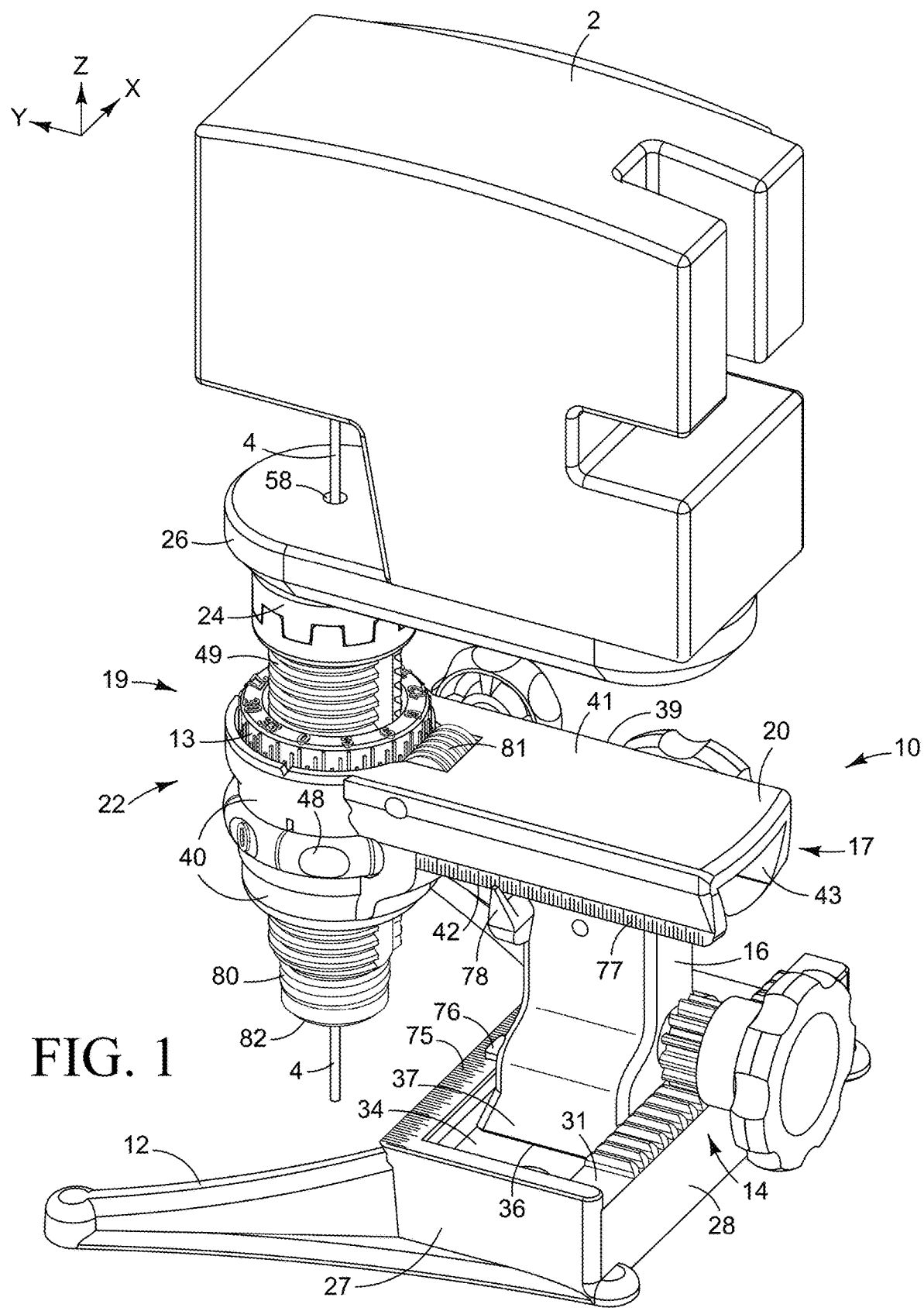
FIG. 1 is a left, top, rear side perspective view of a first exemplary mount assembly attached to a laser unit.
Figure 2:
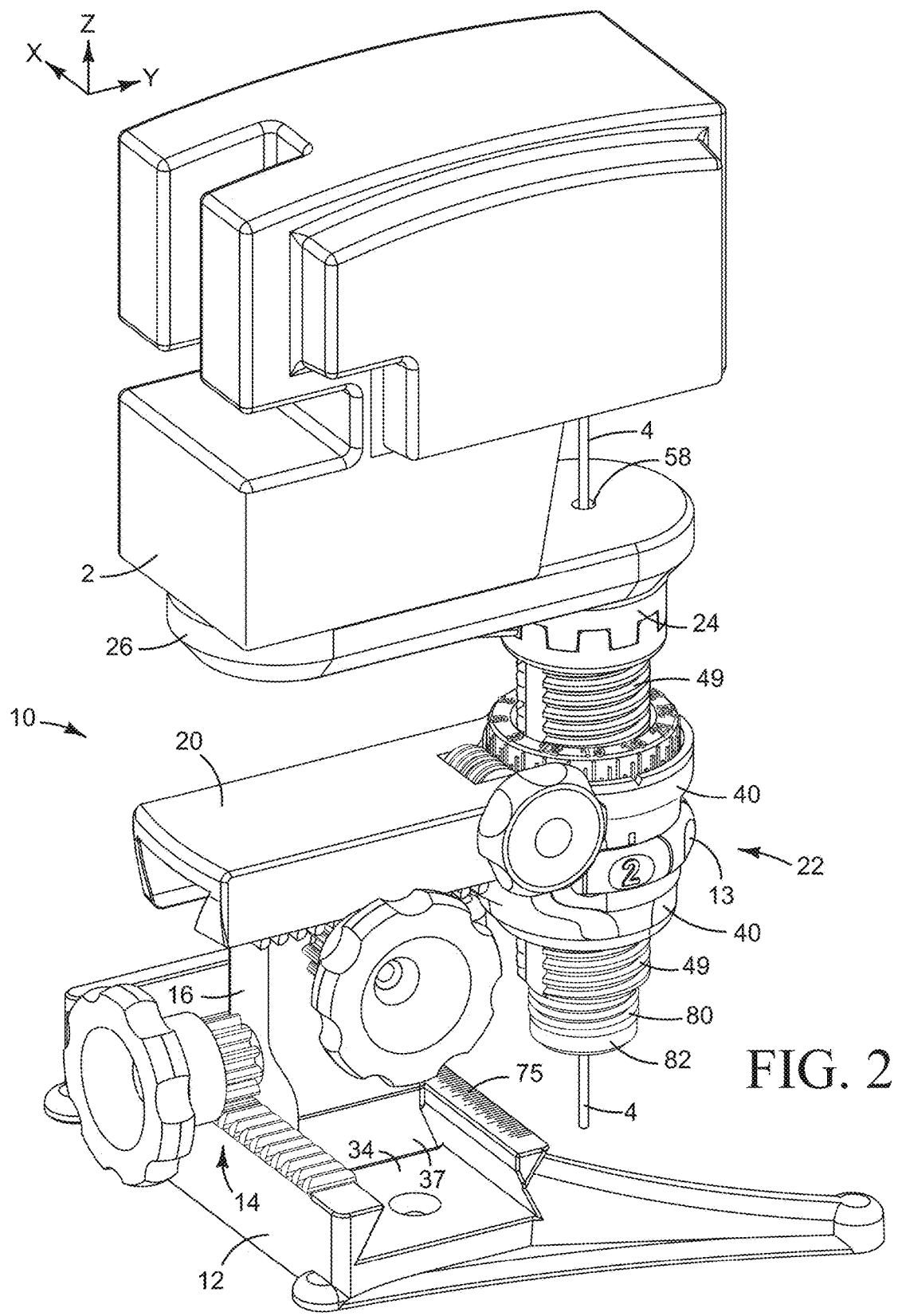
FIG. 2 is a right, top, rear side perspective view of the exemplary mount assembly attached to a laser unit of FIG. 1.
Figure 3:
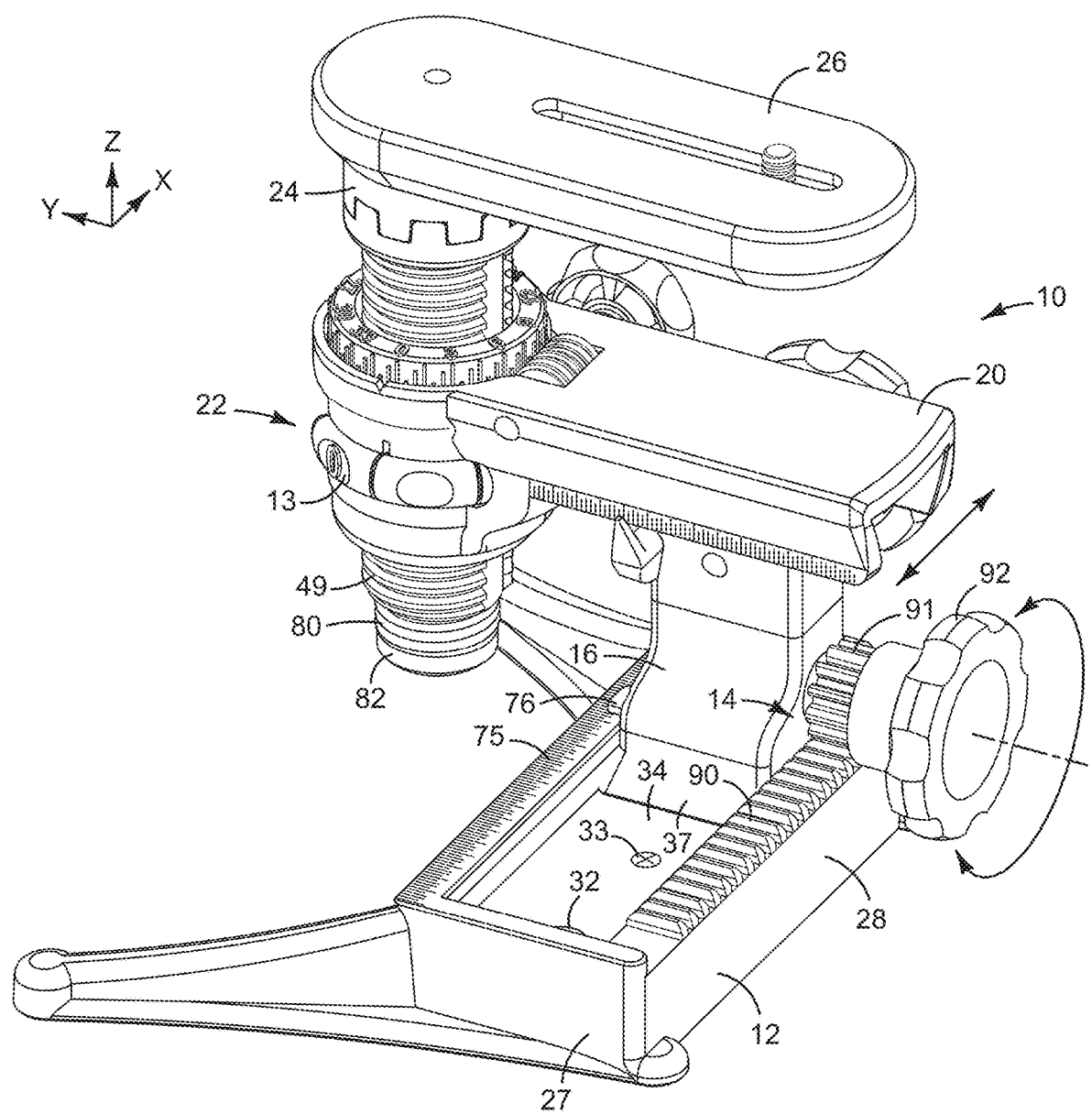
FIG. 3 is a second left, top, rear side perspective view of the first exemplary mount assembly of FIG. 1 (without the laser unit), illustrating X-axis linear movement.
Figure 4:
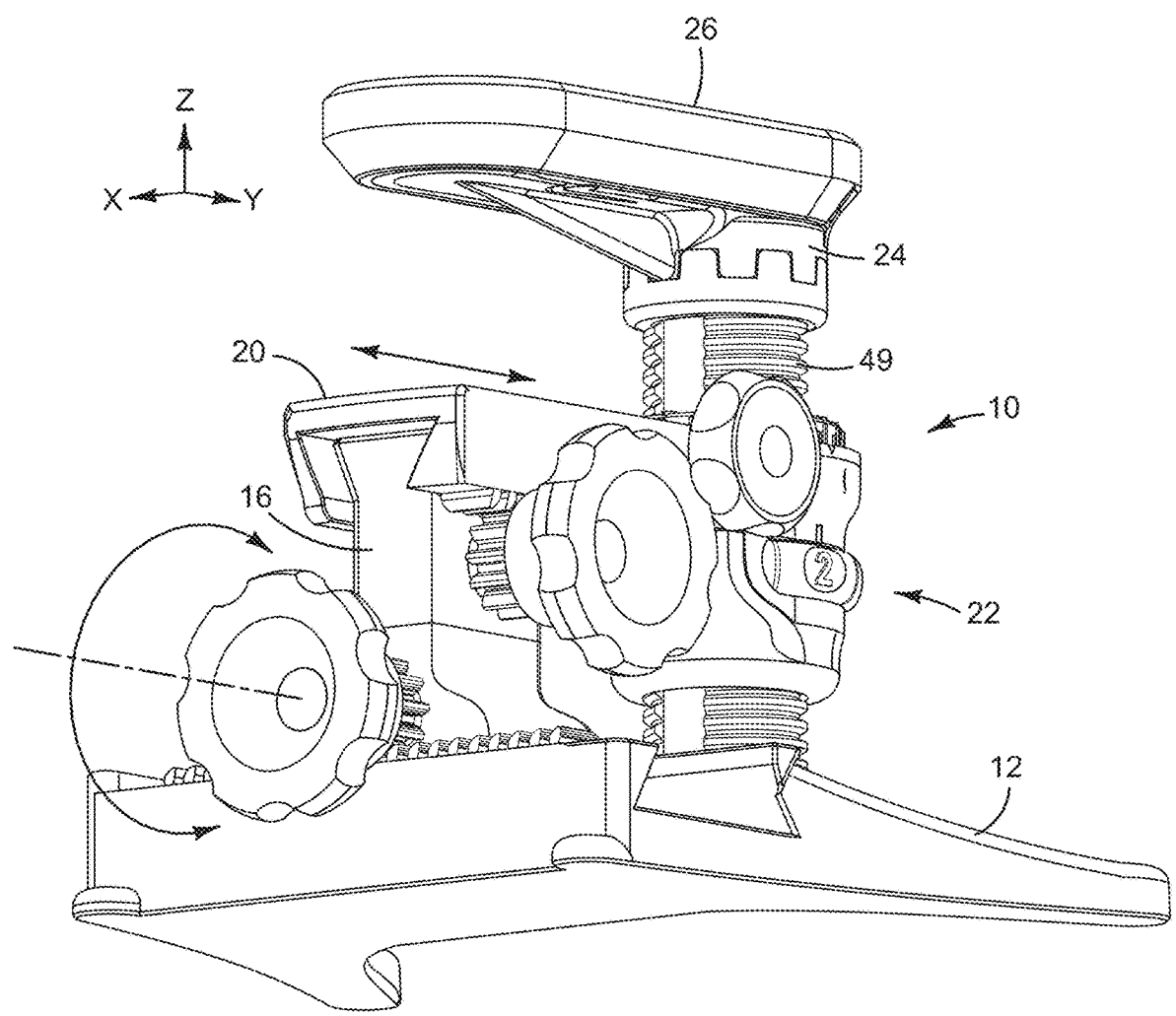
FIG. 4 is a right, bottom, rear side perspective view of the first exemplary mount assembly of FIG. 1 (without the laser unit), illustrating Y-axis linear movement.
Figure 5:
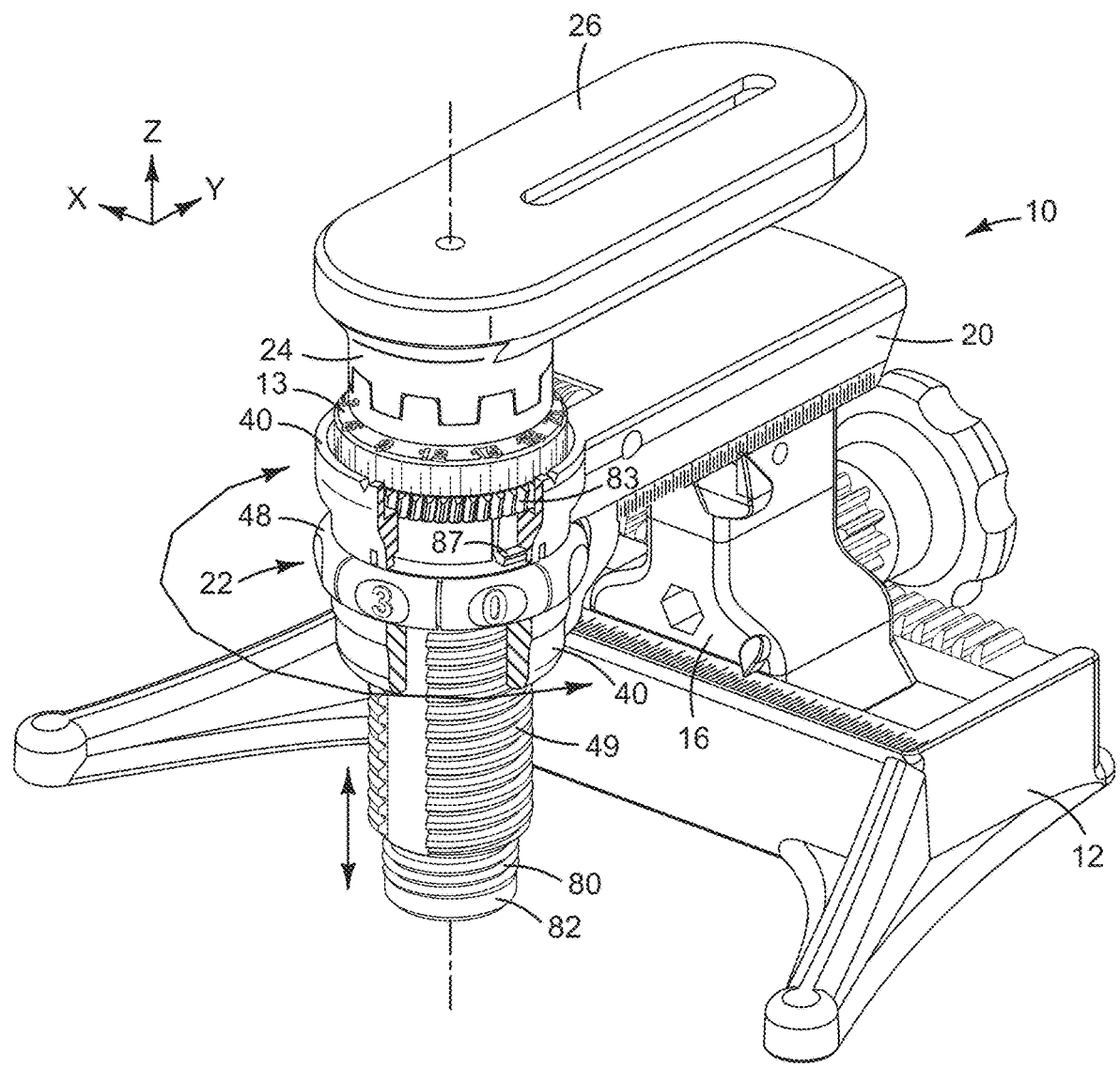
FIG. 5 is a partial left, top, front side perspective view of the first exemplary mount assembly of FIG. 1 (without the laser unit), illustrating Z-axis linear movement.
Figure 6:
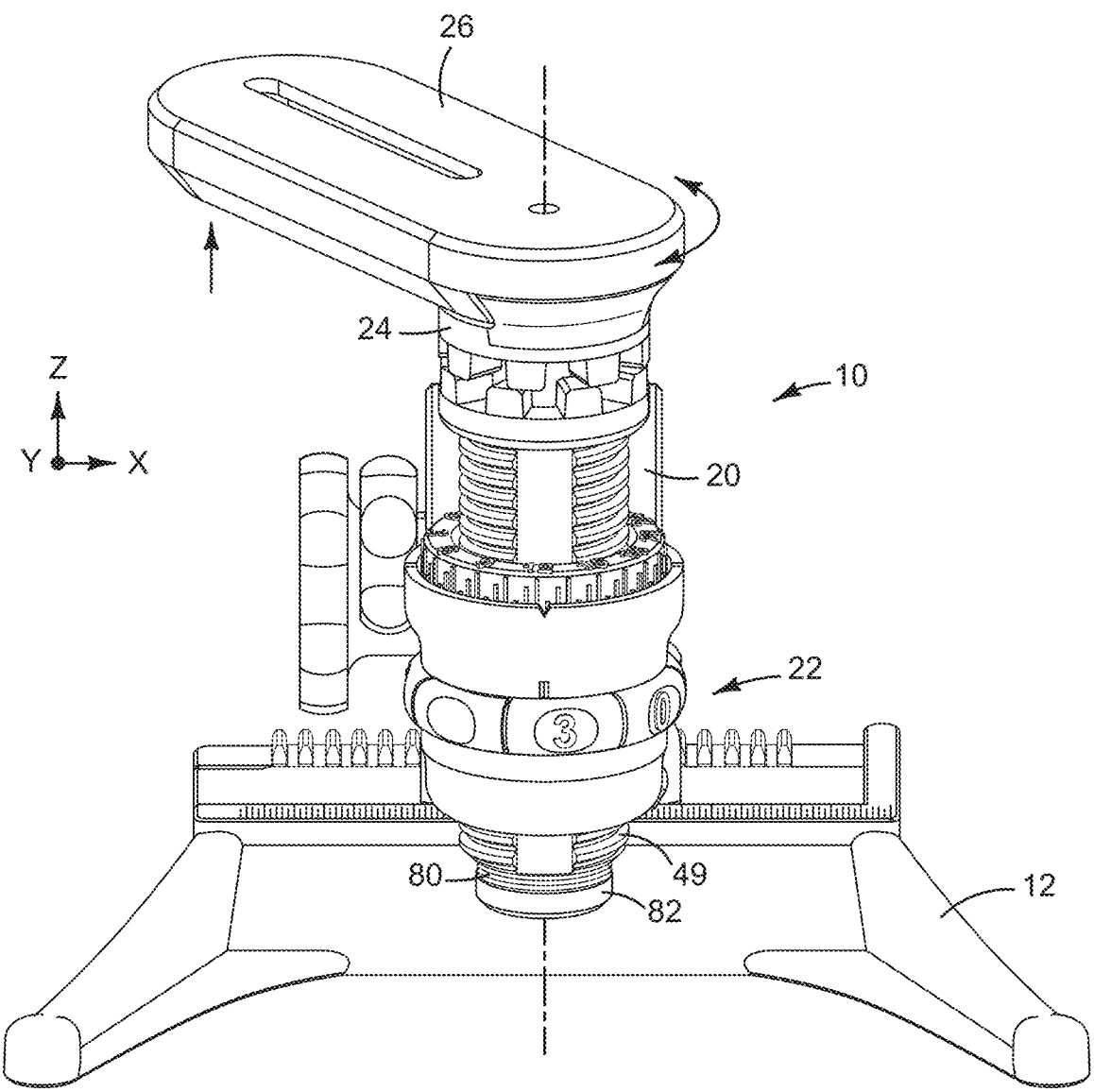
FIG. 6 is a top, front side perspective view of the first exemplary mount assembly of FIG. 1 (without the laser unit), illustrating Z-axis rotational movement through rotation of the support plate assembly with respect to the lifting screw.

The use of "e.g.," "etc," "for instance," "in example," "for example," and "or" and grammatically related terms indicates non-exclusive alternatives without limitation, unless the context clearly dictates otherwise. The use of "including" and grammatically related terms means "including, but not limited to," unless the context clearly dictates otherwise. The use of the articles "a," "an" and "the" are meant to be interpreted as referring to the singular as well as the plural, unless the context clearly dictates otherwise. Thus, for example, reference to "a keyt" includes two or more such keys, and the like. The use of "optionally," "alternatively," and grammatically related terms means that the subsequently described element, event or circumstance may or may not be present/occur, and that the description includes instances where said element, event or circumstance occurs and instances where it does not. The use of "preferred," "preferably," and grammatically related terms means that a specified element or technique is more acceptable than another, but not that such specified element or technique is a necessity, unless the context clearly dictates otherwise. The use of "exemplary" means "an example of" and is not intended to convey a meaning of an ideal or preferred embodiment. Words of approximation (e.g., "substantially," "generally"), as used in context of the specification and figures, are intended to take on their ordinary and customary meanings which denote approximation, unless the context clearly dictates otherwise.

The use of "mountable device" means a device able to be mounted on the mount assembly, unless the context clearly dictates otherwise. Examples of mountable devices include, but are not limited to laser pointers, hybrid point and line laser units, digital cameras, and film cameras. The exemplary mountable device referred to herein is a hybrid point and line laser unit. Reference to a hybrid point and line laser unit being the exemplary mountable device is not intended to be a limitation as to the type of mountable device that can be mounted on an exemplary mount assembly.

The use of "attaching nut" means a threaded connector configured for receiving a threaded fastener such as a bolt or a screw, unless the context clearly dictates otherwise.

The use of the horizontal coordinate system of three orthogonal axes X, Y, and Z whose Z-axis herein defines a vertical direction and whose X-Y plane defines a horizontal plane relative to the earth is discussed herein for reference purpose. In such convention, the X and Y directions could be reversed. To wit, as described herein, an X-axis linear actuator and a Y-axis linear actuator would move orthogonally or at right angles to one another, and a Z-axis linear actuator would move in a direction perpendicular to the X-Y axis directions, as illustrated in the Figures.

The use of "laser unit" means a laser instrument which has one or more lasers, unless the context clearly dictates otherwise. Such a laser instrument is used for projecting one or more laser dots or laser lines onto a surface or object. A laser unit can be a mountable device.

DETAILED DESCRIPTION

The following description and the referenced drawings provide illustrative examples of that which the inventor regards as his invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

A first exemplary mount assembly 10 for a mountable device is illustrated in FIGS. 1 through 11.

The mount assembly 10 is configured to mount to the mountable device 2, as described herein. The combined mount assembly 10 and mountable device 2 can then be set on the floor, mounted on a tripod, mounted on any of the currently available devices intended for mounting a mountable device, or otherwise placed in a working environment.

The purpose of the mount assembly 10 illustrated in FIGS. 1 through 11 is to facilitate manipulation of the plumb projections of the mountable device 2, and to allow a user to more easily place both vertical dots and plumb line projections. The mount assembly 10 preferably also allows for a predefined rotation of the mountable device 2, which allows for a laser projection that is precisely perpendicular to the first alignment a set number of degrees. Further preferably, the mount assembly 10 allows for a fixed rotation around the Z-axis in 45° (or other) increments. While that is preferred, in other exemplary embodiments, the mount assembly 10 will allow the mountable device 2 to freely rotate a full 360° rotation in the Z-axis. Further preferably, a Z-axis rotator 19 of the mount assembly 10 allows for travel along the Z-axis, and rotation along the Z-axis as well.

The mount assembly 10 comprises: a base 12, an X-axis linear actuator 14, an upright support 16, a Y-axis linear actuator 18, a Z-axis rotator 19, an extension arm 20, a Z-axis linear actuator 22, a support plate assembly 24, and a mount 26. A support assembly 17 includes the Y-axis linear actuator 18, upright support 16, and an extension arm 20.

The base 12 comprises a body portion 28. The body portion 28 has a length defined between a left side 27 and a right side 29. The body portion 28 has a bottom side 30 configured for resting upon a surface, and a top side 31 opposite thereto. The bottom side 30 preferably defines at least one fastener hole 32 which enables the base 12 to be fixed to a surface, such as a bench, through use of a fastener (not illustrated). The bottom side 30 preferably further defines at least one threaded connector 33 which is threaded for receiving a ¼-20 threaded screw, such as those commonly found on tripods. The top side 31 of the body portion 28 further defines a first mortise 34. The first mortise 34 is located in the top side 31 along the length. The first mortise 34 defines the X-axis.

Further, the base 12 could comprise a plurality of measurement indicia 75 on a top surface thereof, and the upright support 16 could comprise an indicator 76 extending therefrom. The indicator 76 and the measurement indicia 75 cooperate together to relate to indicate the distance moved along the X-axis, thereby enabling a user to estimate the distance along the X-axis the mountable device 2 has been moved relative to an original position. Preferably, the indicia represent 1.0 mm increments.

The X-axis linear actuator 14 connects between the body portion 28 and the upright support 16. The X-axis linear actuator 14 is configured for moving the extension arm 20 leftward and rightward along the X-axis, resulting in an attached mountable device 2 moving leftward and rightward along the X-axis.

In the exemplary mount assembly 10 illustrated in FIGS. 1 through 10, the X-axis linear actuator 14 comprises a rack 90 on the body portion 28 parallel to the first mortise 34, and a pinion gear 91 rotatably attached to the upright support 16. The pinion 91 comprising a wheel 92 configured for turning by a user. Turning the wheel 92 in a first direction turns the pinion 91 which travels along the rack 90 in a leftward direction, moving the extension arm 20 and support plate assembly 24 in the leftward direction. Turning the wheel 92 in a second direction turns the pinion 91 which travels along the rack 90 in a rightward direction, moving the extension arm 20 and support plate assembly 24 in a rightward direction along the X-axis relative to the base 12.

The upright support 16 has an upper end 35 and a lower end 36. The lower end 36 of the upright support 16 defines a first tenon 37 configured for mating slidable engagement with the first mortise 34. The upper end 35 of the upright support 16 defines a second tenon 38. The second tenon 38 is perpendicular to the first tenon 37. The second tenon 38 defines the Y-axis.

The Y-axis linear actuator 18 is configured for connecting between the upright support 16 and the extension arm 20. The Y-axis linear actuator 18 is utilized to move the extension arm 20 and support plate assembly 24 in a forward direction and a backward direction along the Y-axis.

In the exemplary mount assembly 10 illustrated in FIGS. 1 through 10 these drawings, the Y-axis linear actuator 18 comprises a rack 93 on the bottom side 42 of the truss 39 parallel to the second mortise 43 and a pinion 94 on the upright support 16 (parallel) to the second tenon 38. The pinion 94 comprises a wheel 95 configured for turning by a user. Turning the wheel 95 in a first direction turns the pinion 94 which travels along the rack 93 in a leftward direction, moving the extension arm 20, and support plate assembly 24 in the leftward direction. Turning the wheel 95 in a second direction turns the pinion 94 which travels along the rack 93 in a rightward direction, moving the extension arm 20 and support plate assembly 24 in a rightward direction along the Y-axis relative to the base 12.

Further, the extension arm 20 could comprise a plurality of measurement indicia 77 on a surface thereof, and the upright support 16 could comprise an indicator 78 extending therefrom. The indicator 78 and the measurement indicia 77 cooperating together to relate to distances moved along the Y-axis, thereby enabling a user to estimate the distance along the Y-axis the mountable device 2 has been moved relative to an original position. Preferably, the indicia represent 1.0 mm increments.

The extension arm 20 comprises a truss 39 and a vertical connector 40. The truss 39 having a length, a top side 41 and a bottom side 42. The truss 39 defines a second mortise 43 along the length in the bottom side 42. The second mortise 43 configured for mating slidable engagement with the second tenon 38 of the upright support 16.

Figure 9:
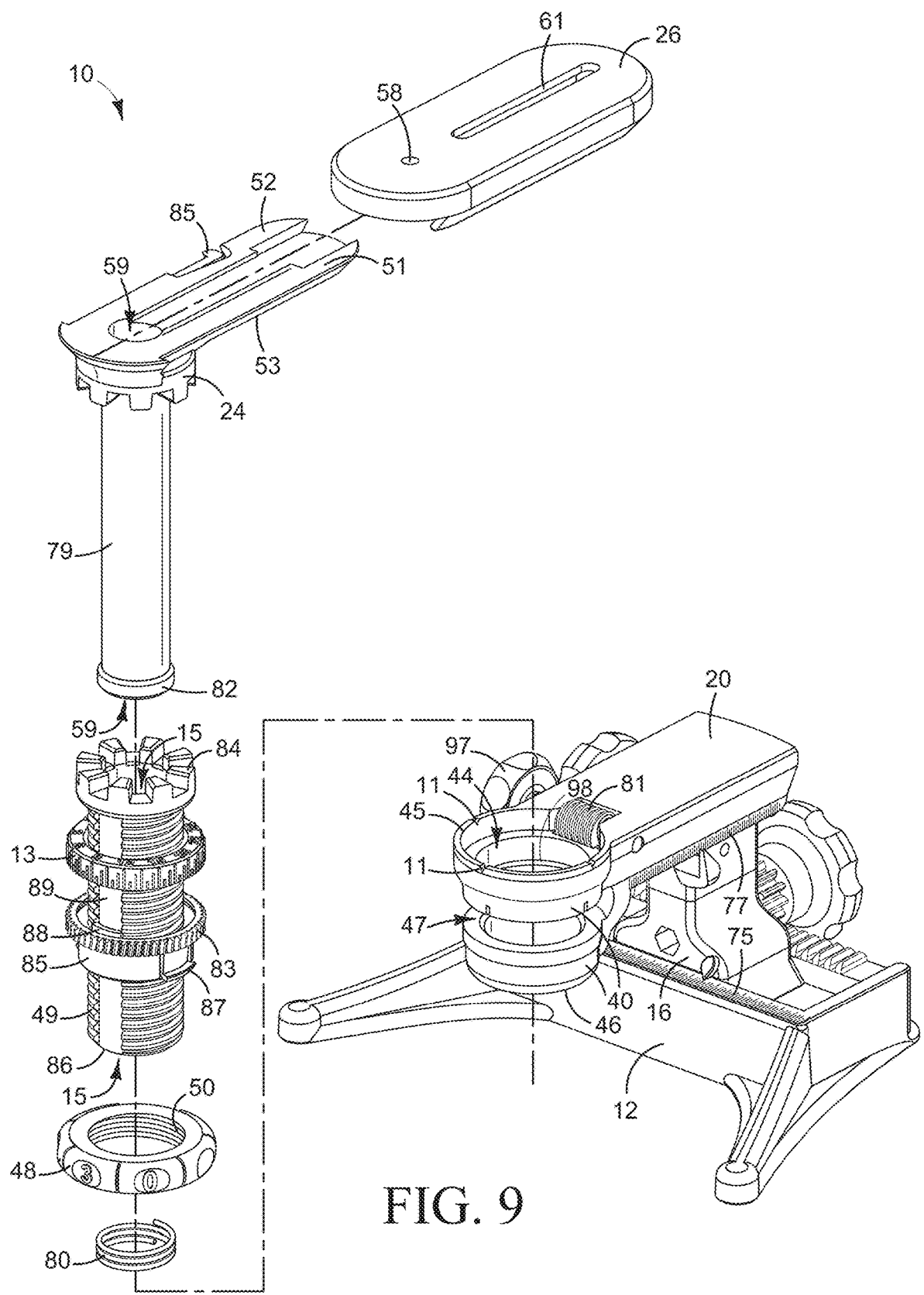
FIG. 9 is an exploded, left, top, front side perspective view of the first exemplary mount assembly of FIG. 1 (without the laser unit).

As illustrated in FIG. 1, the mount assembly 10 further includes a vertical spacer 144. The vertical spacer 144 includes screw threading 149 on an outside surface of a lifting screw 49. The vertical connector 40 has a top opening 45 and a bottom opening 46. The top opening 45 and bottom opening 46 define a vertical passageway 44 therebetween, as illustrated in FIG. 9. The passageway 44 defines a Z-axis. The Z-axis is perpendicular to the X-Y axis directions. The vertical connector 40 is configured for connecting with the support plate assembly 24. The vertical connector 40 further comprises a transverse (horizontal) slot 47 therethrough which is configured for receiving therein a lifter nut 48. After the lifter nut 48 is inserted into the transverse slot 47, the lifting screw 49 can then be inserted into the top opening 45, threaded through the lifter nut 48, and extended out of the bottom opening 46.

Figure 7:
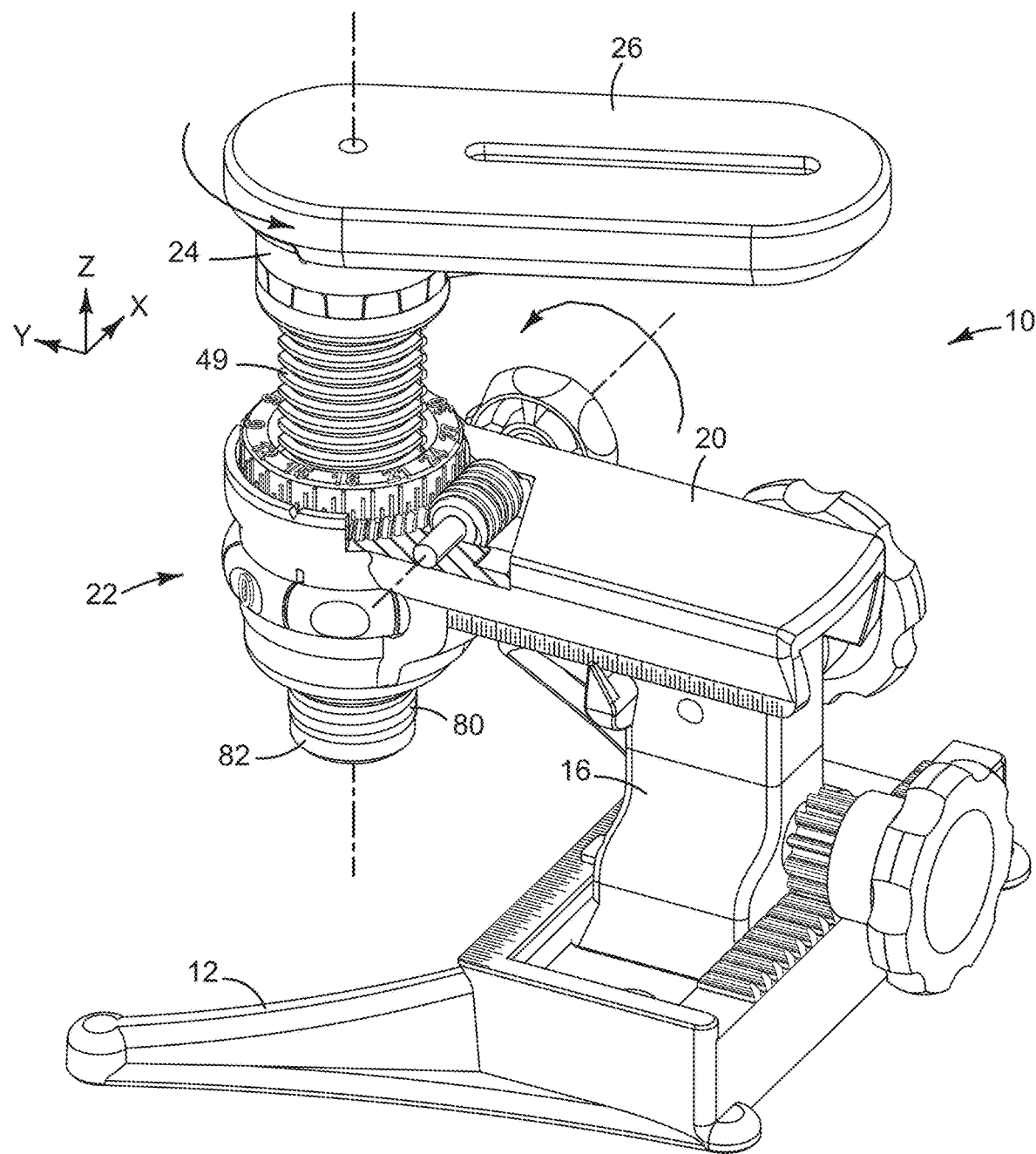
FIG. 7 is a partial, left, top, rear side perspective view of the first exemplary mount assembly of FIG. 1 (without the laser unit), illustrating Z-axis rotational movement through use of the worm gear assembly.

The extension arm 20 further comprises a generally horizontal worm gear 81, as illustrated in FIG. 7. FIG. 7 is a partial, left, top, rear side perspective view of the first exemplary mount assembly 10. As illustrated in that figure, the worm gear 81 partial extends into the vertical passageway 44 (illustrated in FIG. 9) and engages a gear wheel 83 attached to a carriage 85. The worm gear 81 further comprises a worm gear knob 97 configured for turning by a user. Turning the worm gear knob 97 in a first direction turns the worm gear 81 in a first direction which causes the opposing equiradially disposed keys 88 to engage the mating equiradially disposed slots 89 and rotates the lifting screw 49 in a first direction around the Z-axis. Turning the worm gear knob 97 in a second direction turns the worm gear 81 in a second direction which causes the opposing equiradially disposed keys 88 to engage the mating equiradially disposed slots 89 and rotates the lifting screw 49 in a second direction around the Z-axis.

The vertical connector 40, adjacent the top opening 45, preferably comprises at least one indicator 11 and an indexed slip ring 13 having a plurality of indicia for enabling a user to determine degrees of rotation around the Z-axis made by rotation of the worm gear knob 97. The indexed slip ring 13 configured for an interference fit against the lifting screw 49. Preferably, the indicia represent 1.0 mm increments.

The vertical passageway 44 comprises a spring catch ledge 98 configured for engaging a spring catch 87 on a carriage 85. The carriage 85 further comprises a pair of opposing equiradially disposed keys 88. The keys 88 are configured for receipt into mating equiradially disposed slots 89 defined on the lifting screw 49.

The Z-axis linear actuator 22 connects between the extension arm 20 and the support plate assembly 24. The Z-axis linear actuator 22 is configured for moving the support plate assembly 24 in an upward direction and in a downward direction along the Z-axis. This results in an attached mountable device 2 moving upwards and downwards along the Z-axis.

In the exemplary mount assembly 10 illustrated in these drawings, the Z-axis linear actuator 22 comprises a screw jack 146. The screw jack 146 comprises the lifter nut 48 and the threads internal hub 50 on the lifting screw 49 of the support plate assembly 24. The lifter nut 48 is configured for manual rotation by a user. The lifter nut 48 has an internal hub 50 which is internally threaded for driving the lifting screw 49. Rotation of the lifter nut 48 in a first direction causes the lifting screw 49 to advance in an upwards direction away from the base 12, and rotation of the lifter nut 48 in a second direction cause the lifting screw 49 to advance in a downwards direction towards the base 12. The lifting screw 49 for supporting the support plate 51 of the support plate assembly 24. The support plate assembly 24 comprises a support plate 51 having a top side 52. The support plate 51 for supporting the mountable device 2.

Figure 8:
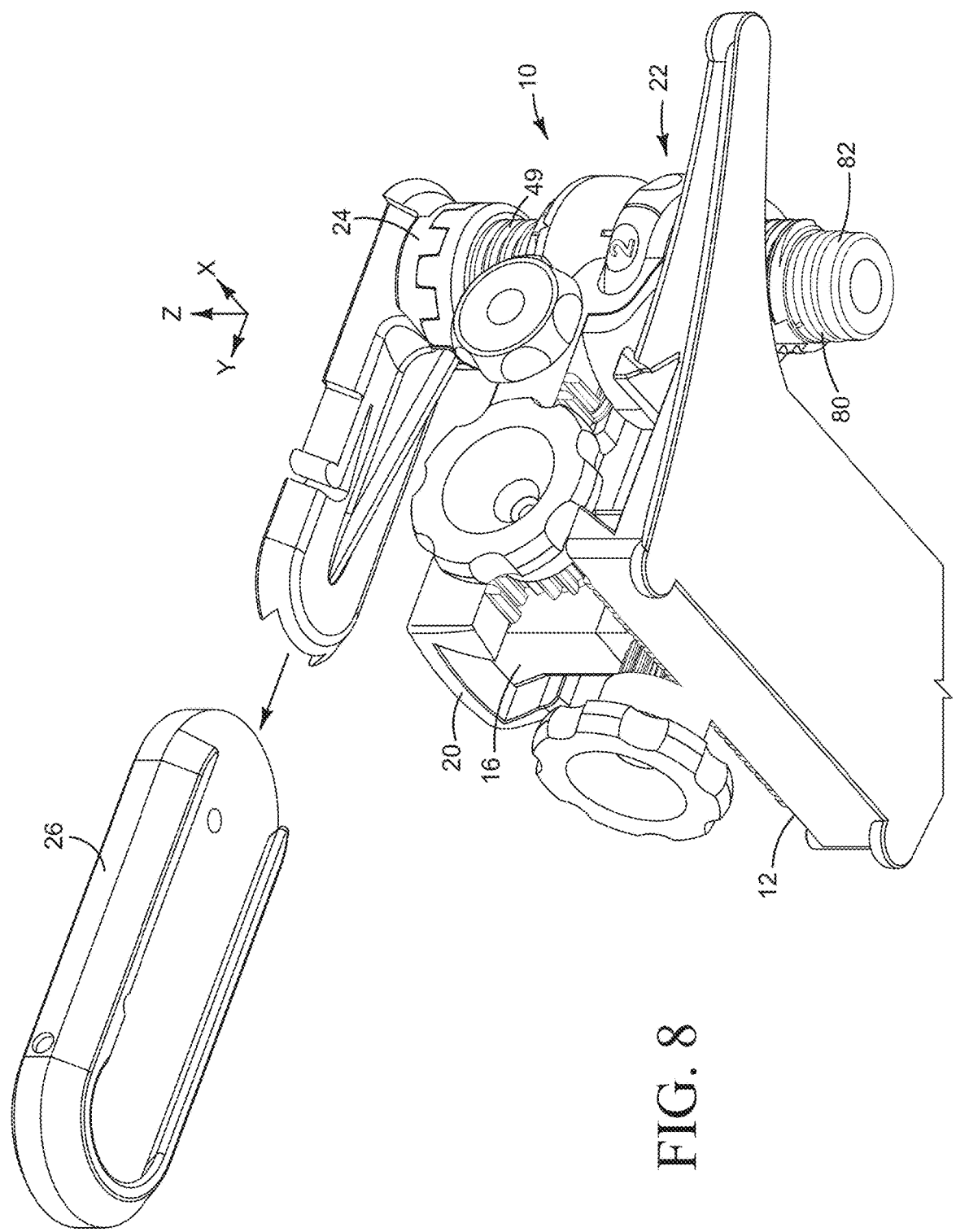
FIG. 8 is a bottom, right, rear side perspective view of the first exemplary mount assembly of FIG. 1 (without the laser unit), illustrating the mount being releasably connectable to the support plate.

The top side 52 of the support plate assembly 24 is configured for receiving the mount 26 thereon. The mount 26 having a top side 54 and a bottom side 53. The top side 54 comprises a platform for supporting the mountable device 2. The mount 26 bottom side 53 is configured for connection to the support plate assembly 24. Preferably, the mount 26 is configured for locking onto the support plate assembly 24, as is illustrated in the Figures. Specifically, FIG. 8 illustrates the support plate assembly 24 comprising a flexible detent protrusion 55 configured for interlocking with a detent indentation 56 defined in the mount 26. The type of connection between the support plate assembly 24 and the mount 26 illustrated in the drawings is a mortise and tenon style connection. While such a connection is illustrated in the drawings, a skilled artisan will be able to select an appropriate connection manner for the releasable connection between the mount and the support plate assembly in a particular embodiment based on various considerations, including the intended use of the mounting assembly, the intended arena within which the mounting assembly will be used, and the equipment and/or accessories with which the mounting assembly is intended to be used, among other considerations.

It is preferred that the mount 26 be configured for removal from the support plate 51 of the support plate assembly 24. Such removal supports the optional use of a sloper unit 60, discussed below. Alternatively, the mount 26 could be fixed to the support plate 51.

The mount 26 further comprises a top screw slot 61 defined therein for enabling a threaded fastener (not illustrated), such as an attaching screw, to be passed therethrough. The fastener utilized for attaching the mount 26 to the bottom side of the mountable device 2 via an attaching nut. Such an attaching screw could comprise a clamping rod having a threaded end portion and a knurled end portion. In such a configuration, when the knurled end portion is turned in a first direction, the threaded end portion can be threaded into the attaching nut of the device, thus clamping the mountable device 2 to the mount 26.

Preferably, a passageway 59 is defined through the mount assembly 10, so that a plumb laser beam 4, emitted by an attached mountable device 2 (illustrated in FIGS. 1 and 2), can pass through plumb hole 58 in the mount 26, into passageway 59 (illustrated in FIG. 9), and out the bottom end of the passageway 59. The passageway 59 can be best seen in FIG. 9 which illustrates the mount 26 as having a plumb hole 58, which aligns with the passageway 59 that extends through the support plate assembly 24, and out the bottom most end of the lifting screw 49. The passageway 59 can comprise one or more aligned passageways, for instance passageway 15.

Figure 10:
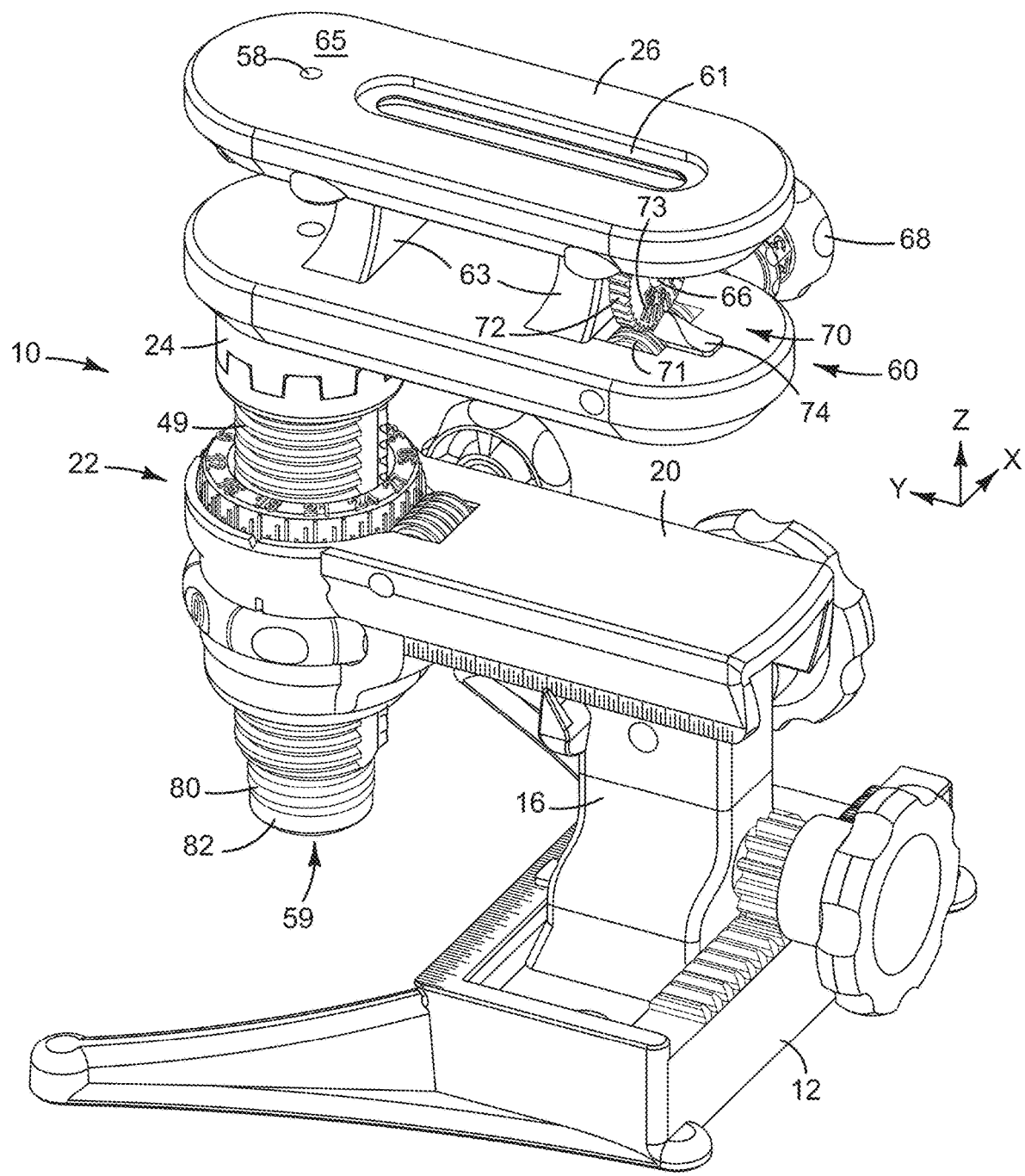
FIG. 10 is a left, top, rear side perspective view of a first exemplary mount assembly (without the laser unit), with an exemplary sloper unit attached.
Figure 11:
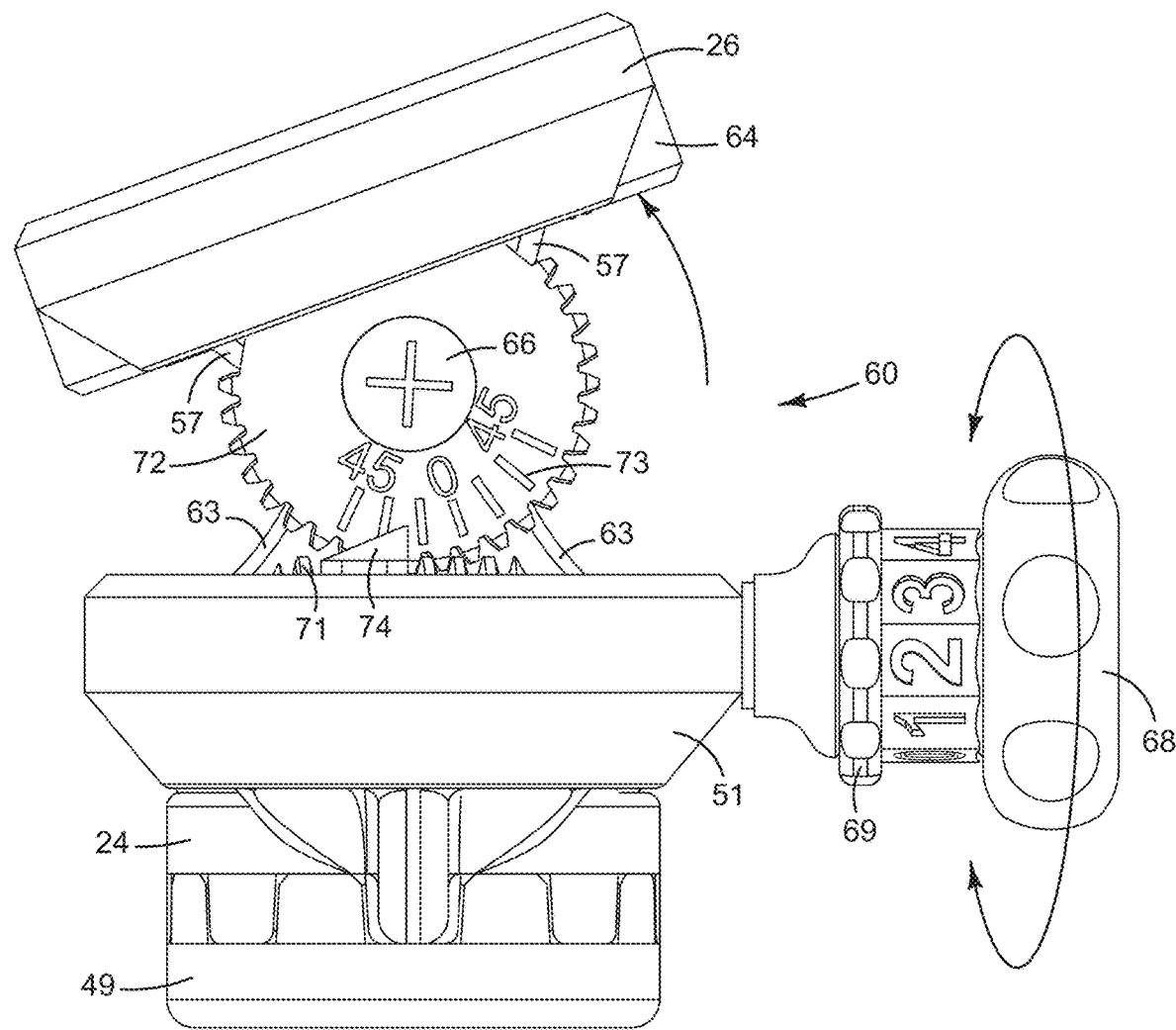
FIG. 11 is a partial, rear side view of the exemplary sloper unit of FIG. 10, illustrating tilt.

Referring now to FIGS. 10 and 11, illustrated is an optional sloper unit 60 which can be utilized with the mount assembly 10. The sloper unit 60 for enabling the mountable device 2 attached to the mount assembly 10 to be tilted. The sloper unit 60 comprising a base unit 62 having lower supports 63 which pivotally connect at a pivot 66 to upper supports 57 connecting to the tilt plate 64. In such an arrangement, the base unit 622 is pivotally connected to the tilt plate 64.

The top side 52 of the support plate assembly 24 is further configured for receiving the sloper unit 60 thereon. The tilt plate 64 has a top side 65 for supporting the mountable device 2. The base unit 622 has a bottom side 53 which is configured for connection to the support plate assembly 24. Preferably, the base unit 622 is configured for locking onto the support plate assembly 24, as is illustrated in the FIGS. 10 and 11. Specifically, the support plate assembly 24 comprises a flexible detent protrusion 55 configured for interlocking with a detent indentation (not illustrated) defined in the base unit 622. The type of connection between the sloper unit 60 and the support plate assembly 24 illustrated in the drawings is a mortise and tenon style connection. While such a connection is illustrated in the drawings, a skilled artisan will be able to select an appropriate connection manner for the releasable connection between the mount and the support plate assembly in a particular embodiment based on various considerations, including the intended use of the mounting assembly, the intended arena within which the mounting assembly will be used, and the equipment and/or accessories with which the mounting assembly is intended to be used, among other considerations.

The sloper unit 60 further comprises a tilt actuator 70. The tilt actuator 70 comprises a worm gear 71 attached to said base unit 62, and a gear wheel 72 attached to the tilt plate 64. In such an arrangement, the tilt plate 64 is tiltably connected to the base unit 62 so that a mountable device 2 attached to the mount assembly 10 can be tilted within the X-Y plane. The tilt actuator 70 illustrated in these figures comprises a worm gear and gear wheel. While such a configuration is illustrated and described, a skilled artisan will be able to select an appropriate configuration for the tilt actuator in a particular embodiment based on various considerations, including the intended use of the mount assembly, the intended arena within which the mount assembly will be used, and the equipment and/or accessories with which the mount assembly is intended to be used, among other considerations.

The worm gear 71 meshes with a gear wheel 72. The worm gear 71 attaches via a shaft (not illustrated) to a turning wheel 68. Adjacent the turning wheel 68 is an indicia wheel 69 connected to the shaft via an interference fit. The indicia wheel 69 can be turned until a specific indicia (number) is vertical, and then turn the turning wheel 68 until a desired other indicia number is vertical on the indicia wheel 69. The tilt actuator 70 further comprises a plurality of indicia 73 on the gear wheel 72. An indicator 74 is provided on the base unit 62 for cooperating with the indicia 73 to enable a user to determine the approximate degrees of slope which the sloper unit 60 is currently tilted at.

FIG. 10 illustrates the base unit 62 of the sloper unit 60 being slid onto the support plate 51, and the mount 26 slid onto the tilt plate 64 of the sloper unit 60.

The sloper unit 60 allows the user to move the pitch of the beam of the mountable device 2 up and down a few degrees. Where the mountable device 2 is a laser unit, the sloper unit 60 also allows the user to effectively un-level the laser, making use of a function found on many of the current lasers to fix the gimbals allowing this tip to function. The sloper unit 60 illustrated in the drawings allows for up to 45 degrees of tilt. A skilled artisan will be able to select an appropriate structure and material for the linear actuator in a particular embodiment based on various considerations, including the intended use of the mountable device leveling mount, the intended arena within which the mountable device leveling mount assembly will be used, and the equipment and/or accessories with which the mountable device leveling mount assembly is intended to be used, among other considerations.

Alternatively, the sloper unit 60 could have a pre-set degree of tilt and not be adjustable. Alternatively, the sloper unit 60 could be able to tilt one or more of forward (rotating in the Y-axis), backwards (rotating in the Y-axis), to the left (rotating in the X-axis), or to the right (rotating in the X-axis). Further the tilting mechanism could be mechanically actuated, or can be electronically actuated, for instance through a connection with an input device (e.g., a button, a sensor, a mobile device wirelessly connected to the tilting mechanism).

The base unit 622 further comprises a plumb hole 67 in the tilt plate 64. The plumb hole 67 aligned with the plumb hole 58 in the mount 26. The plumb holes 58, 67 aligned with the passageway 59 defined through the mount assembly 10 (along the Z-axis of rotation), so that a plumb laser beam 4, emitted by an attached mountable device 2 (illustrated in FIGS. 1 and 2), can pass through plumb hole 58 in the mount 26, the plumb hole 67 in the sloper unit 60, into the passageway 59, and out the bottom end of the passageway 59. One possible diameter for a plumb hole is 3.0 mm. In other embodiments of the invention such plumb holes/passageway may not be utilized.

The lifting screw 49 comprises a top end 84. The top end 84 and the bottom side 53 comprise interlocking notches and grooves.

The lifting screw 49 has a top end 84 extending to a bottom end 86, the ends defining a passageway 15 therethrough. The support plate assembly 24 further comprises a riser 79 extending from the bottom side 53 of the support plate 51, a spring 80, and end cap 82. The riser 79 having a distal end spaced apart from the support plate 51. The passageway 15 is configured for receiving the riser 79 therethrough. The riser 79 terminating in the end cap 82. The spring 80 is placed between the end cap 82 and the bottom of the vertical connector 40. The spring 80 exerts a force upwards on the riser 79, the top end 84 of the lifting screw 49 in engagement with the bottom side 53 of the support plate 51. Preferably, the structure of both the top end 84 of the lifting screw 49 and the portion of the bottom side 53 of the support plate 51 are configured for interlocking engagement, such as is illustrated in FIGS. 1 through 10. Through use of such an interlocking engagement, specific angles of rotation (e.g., 30, 60, 90, 180, etc.) could be provided for. Optionally, the lifting screw 49 could directly attach to the support plate assembly 24.

Referring now to FIGS. 12 through 20, the second exemplary mount assembly 110 is illustrated. The second exemplary mount assembly 110 is also configured for attachment to a mountable device 2. The second exemplary mount assembly 110 is similar to the first exemplary mount assembly 10 illustrated in FIGS. 1 through 11 and described above, except as detailed below.

Figure 12:
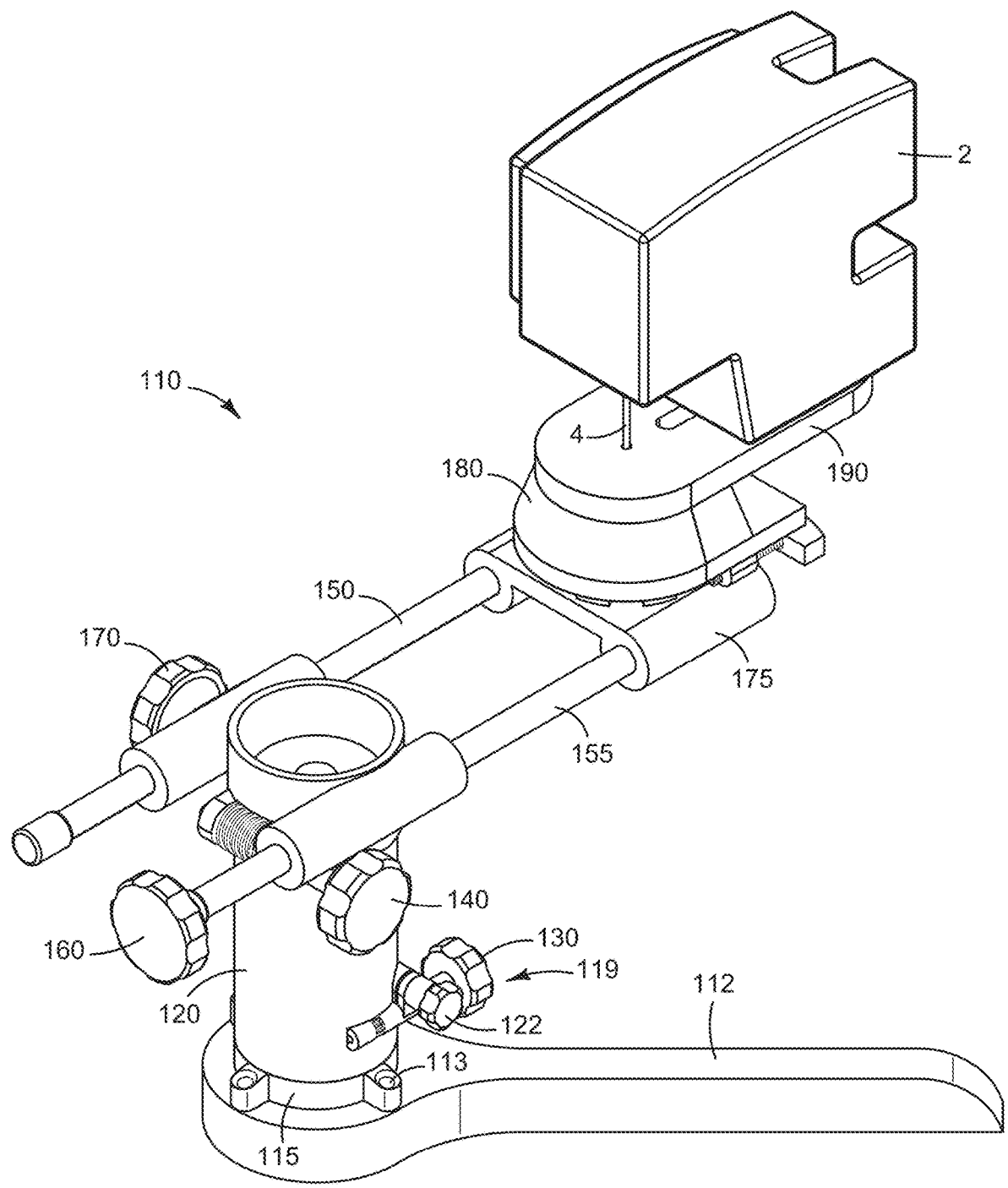
FIG. 12 is an upper isometric view of a second exemplary mount assembly attached to a laser unit.
Figure 13:
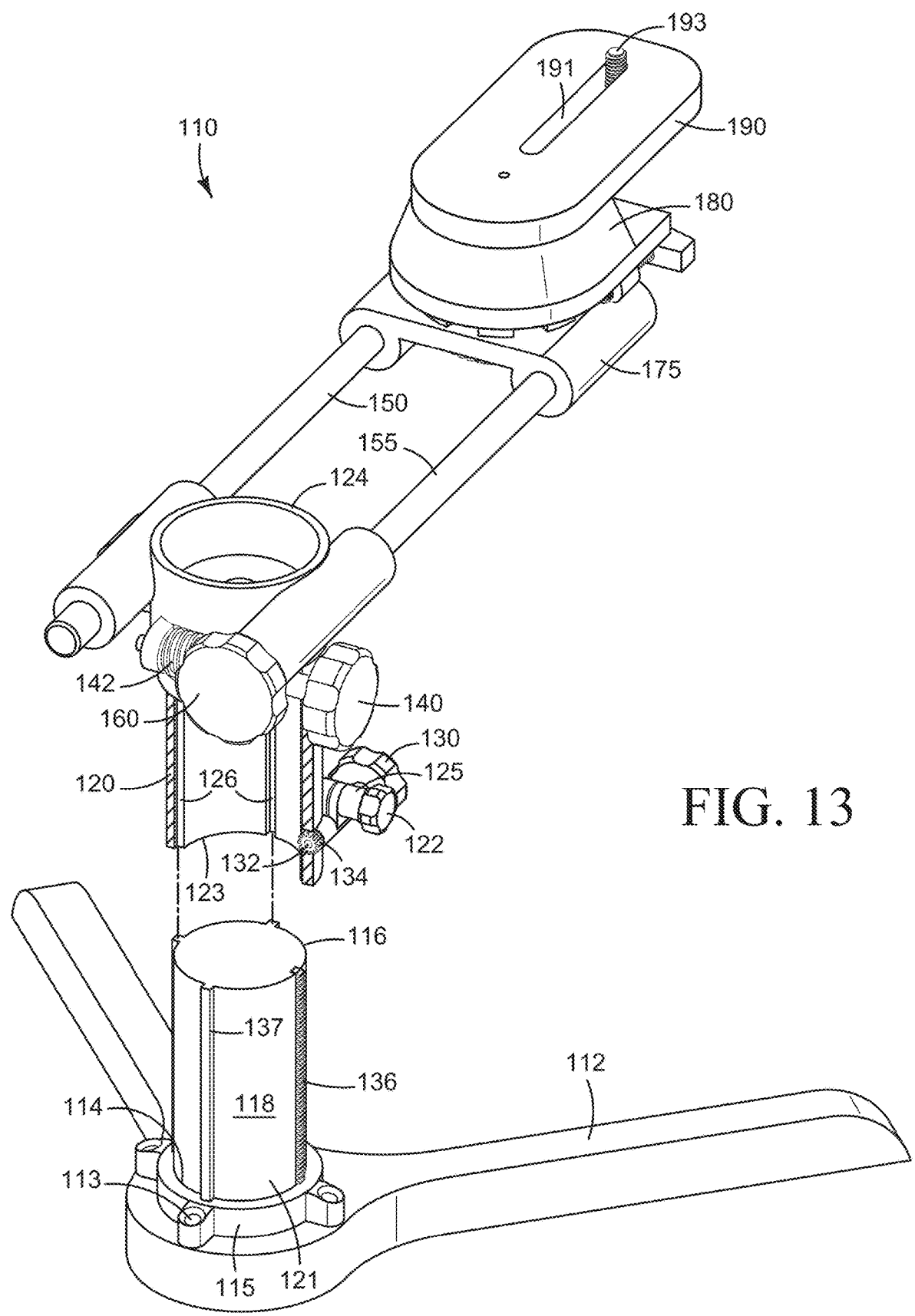
FIG. 13 is an upper perspective partial section view of the exemplary mount assembly of FIG. 12, without the laser unit.
Figure 13:
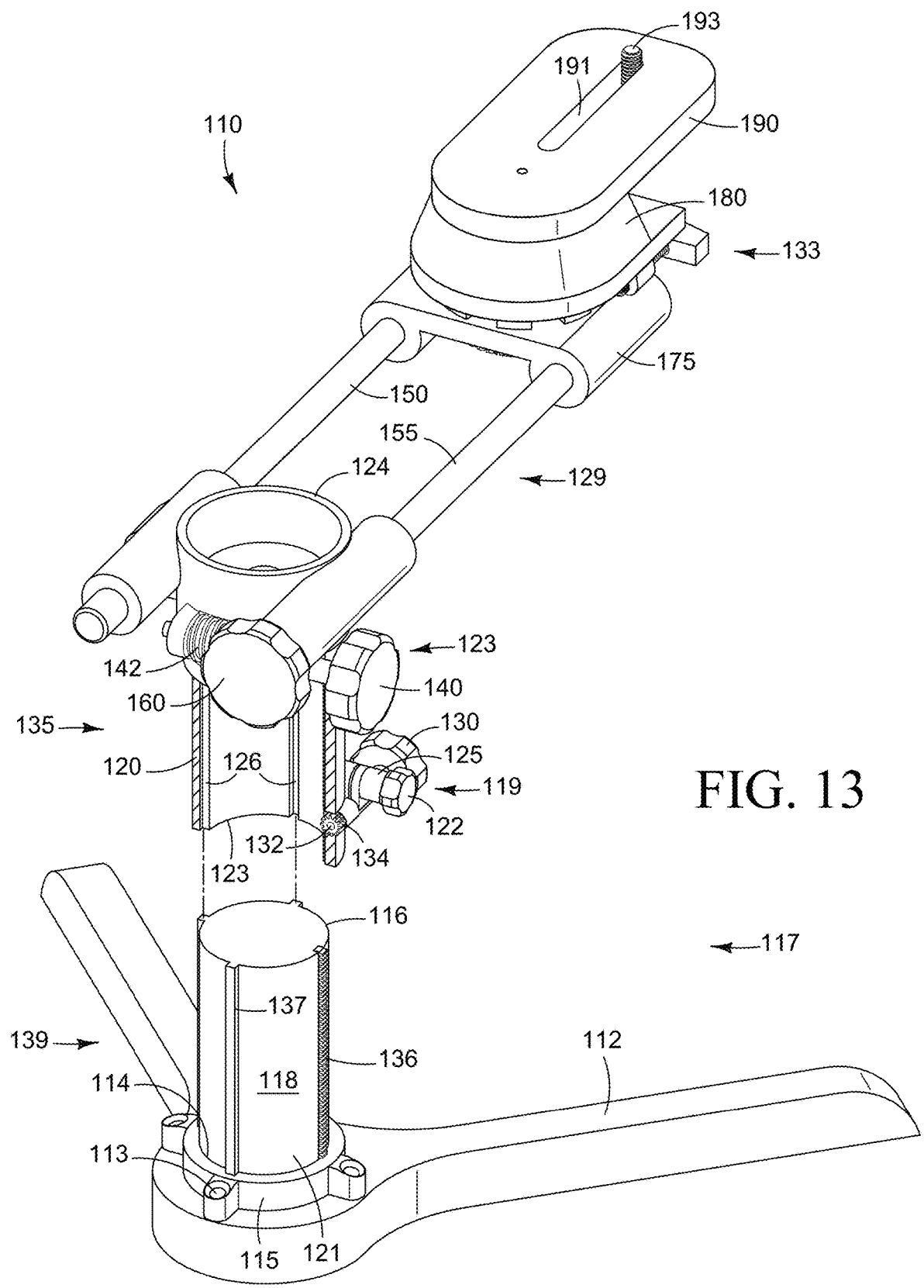
Figure 14:
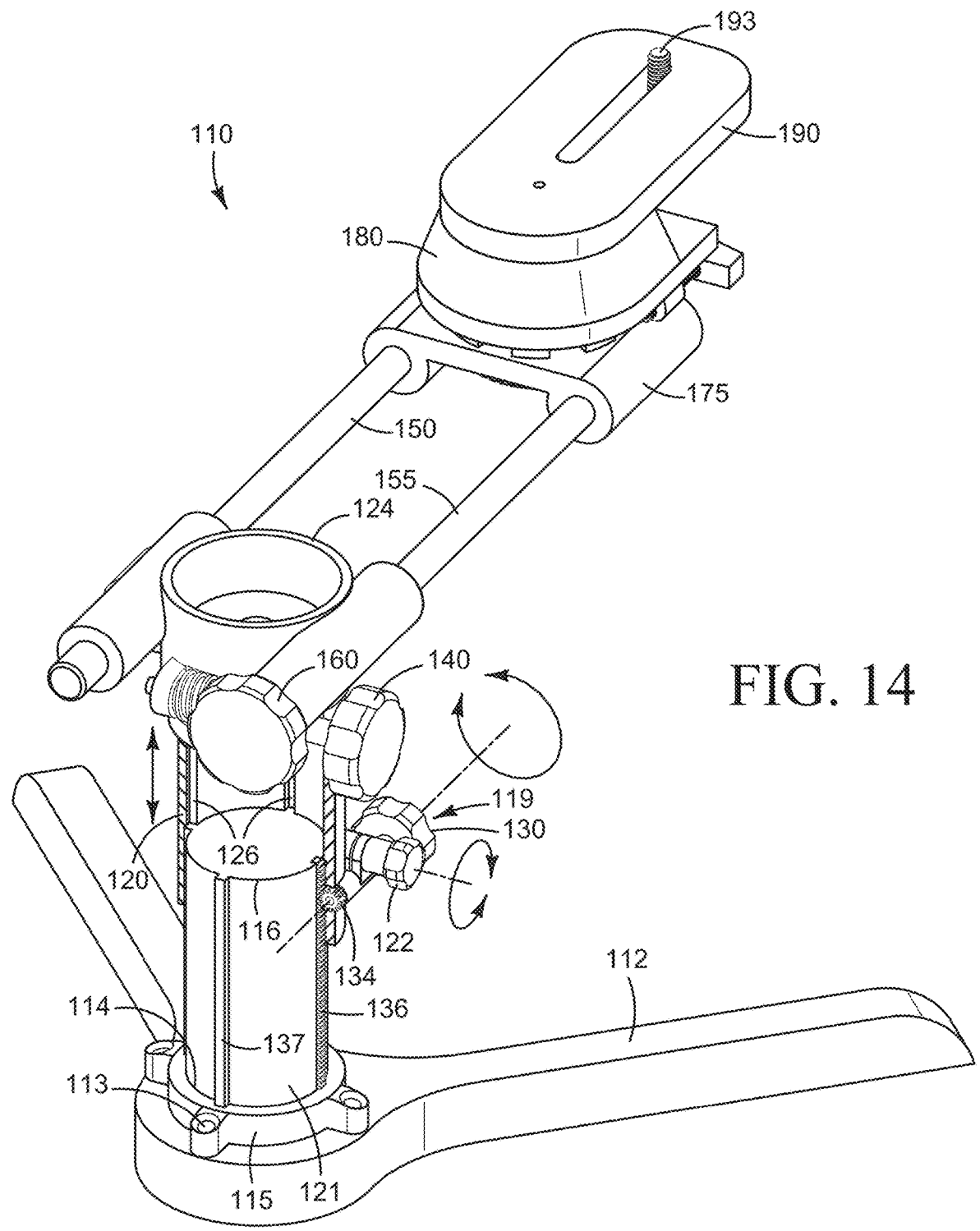
FIG. 14 is an upper perspective partial section view of the exemplary mount assembly of FIG. 12, without the laser unit.

Referring initially to FIGS. 12 through 14, the second exemplary mount assembly 110 includes base 112 configured for resting upon or mounting to a surface. The base 112 can be configured for mounting on a separate foot, or attached to a tripod or commercially manufactured mount, via ¼, 20 screws, or screwed to a horizontal object. As illustrated in FIG. 13, the second exemplary mount assembly 110 further includes a support assembly 117, a Z-axis rotator 123, a horizontal spacer 129, a Z-axis linear actuator 119, horizontal linear actuator 177, and a mount assembly 133. The support assembly 117 includes an upper portion 135 and a lower portion 139.

The second exemplary mount assembly 110 further includes a rack 121 for attaching to the base 112. The rack 121 having a connector platform 115 configured for connecting to the base 112 via a plurality of fasteners 113. The connector platform 115 having a top surface 114 which the rack 121 extends upwards from. The rack 121 comprising a plurality of axially extending keys 137 and an axially extending rack 136 extending from the outer surface 118 of the rack 121. In the embodiment illustrated in these figures, the number of keys is three. It is further preferred that the keys and the rack are equiradially disposed.

The second exemplary mount assembly 110 further comprises sleeve 120 configured for sliding onto the rack 121. The sleeve 120 comprising a plurality of axially extending channels 126 configured for receiving the keys 137. The mating of these channels 126 and keys 137 prevent the sleeve 120 from rotation relative to the rack 121. The sleeve 120 comprising an opening through which a pinion gear 134 partially extends through the sleeve 120 so as to engage the rack 121.

The pinion gear 134 is fitted to a shaft 132 which is rotationally connected to the rack 121, and which terminates in a wheel 130. A pinion lock 125 for locking the rotation of the shaft 132 is further provided on the sleeve 120, the pinion lock 125 can be operated by a handle or knob 122. Rotation of the wheel 130 in a first direction turns the pinion gear 134 in the same direction, which results in the pinion gear 134 (and the attached sleeve 120) traveling along the rack 136 in a first vertical direction, thereby moving an attached mountable device 2 in an upwards direction along the Z-axis. Rotation of the wheel 130 in a second direction turns the pinion gear 134 in the same direction, which results in the pinion gear 134 (and the attached sleeve 120) traveling along the rack 136 in a second vertical direction, thereby moving an attached mountable device 2 in an downwards direction along the Z-axis. Such structure defining a Z-axis actuator 119.

Figure 15:
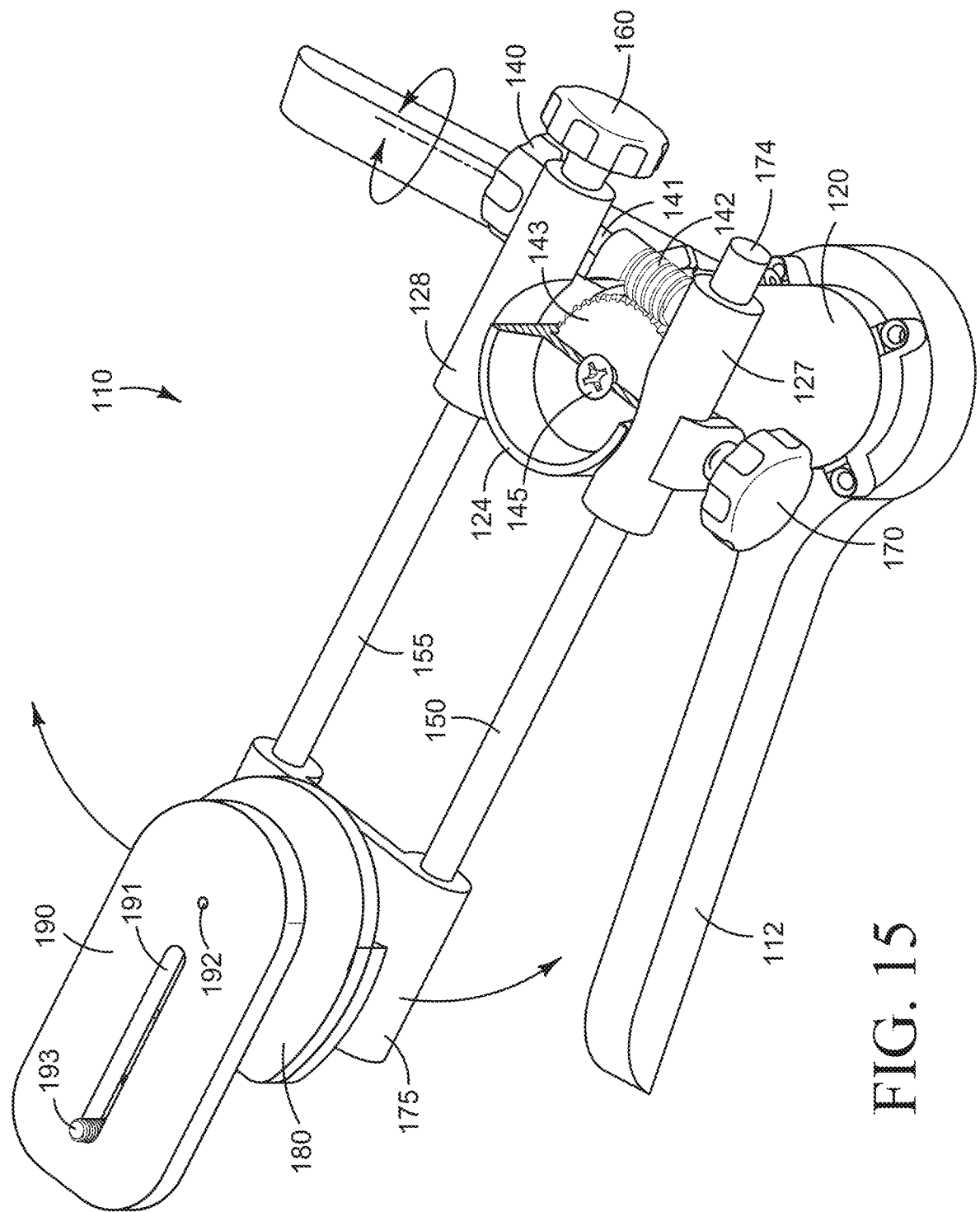
FIG. 15 is an upper perspective partial section view of the exemplary mount assembly of FIG. 12, without the laser unit.
Figure 16:
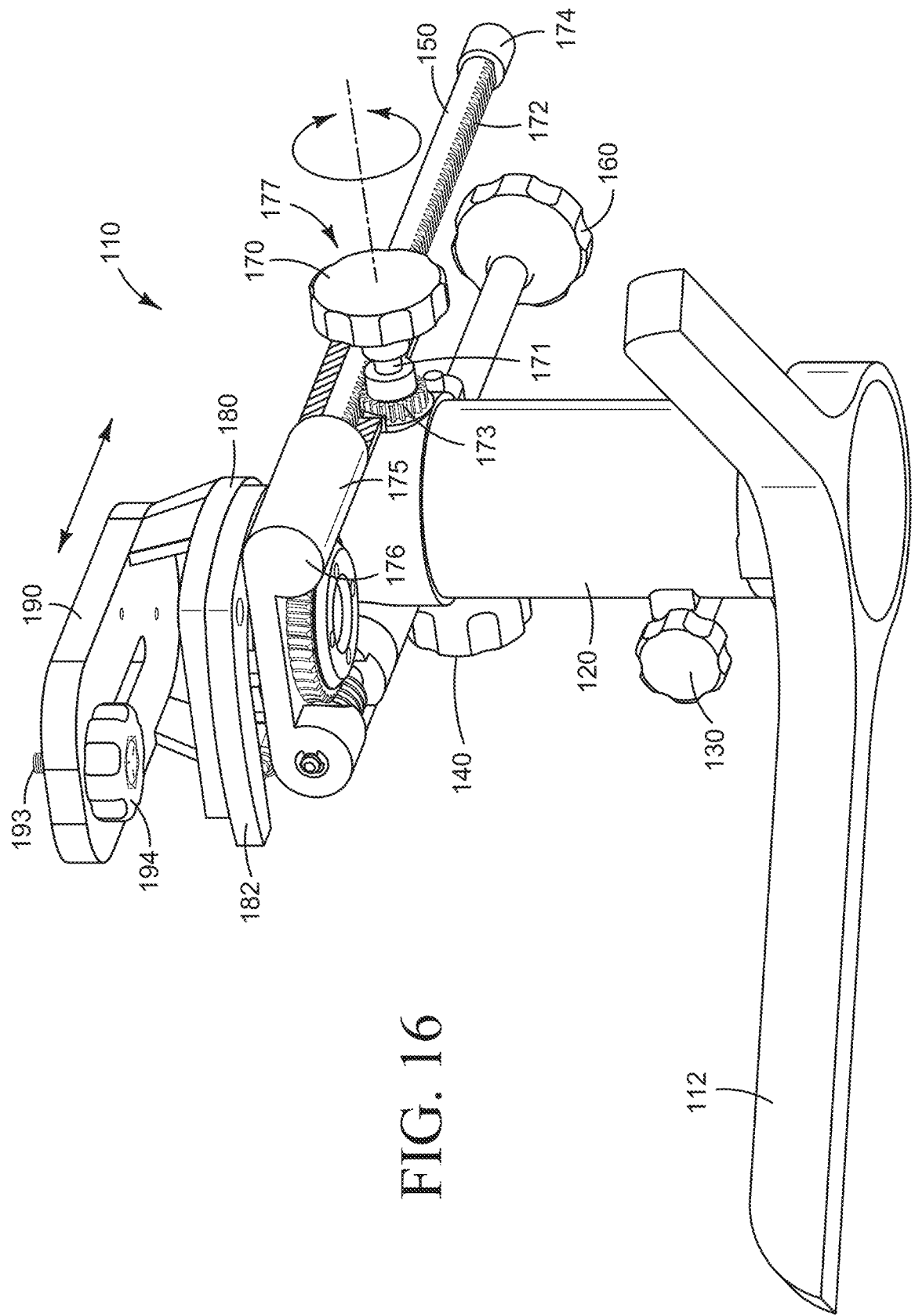
FIG. 16 is a lower perspective partial section view of the exemplary mount assembly of FIG. 12, without the laser unit.
Figure 17:
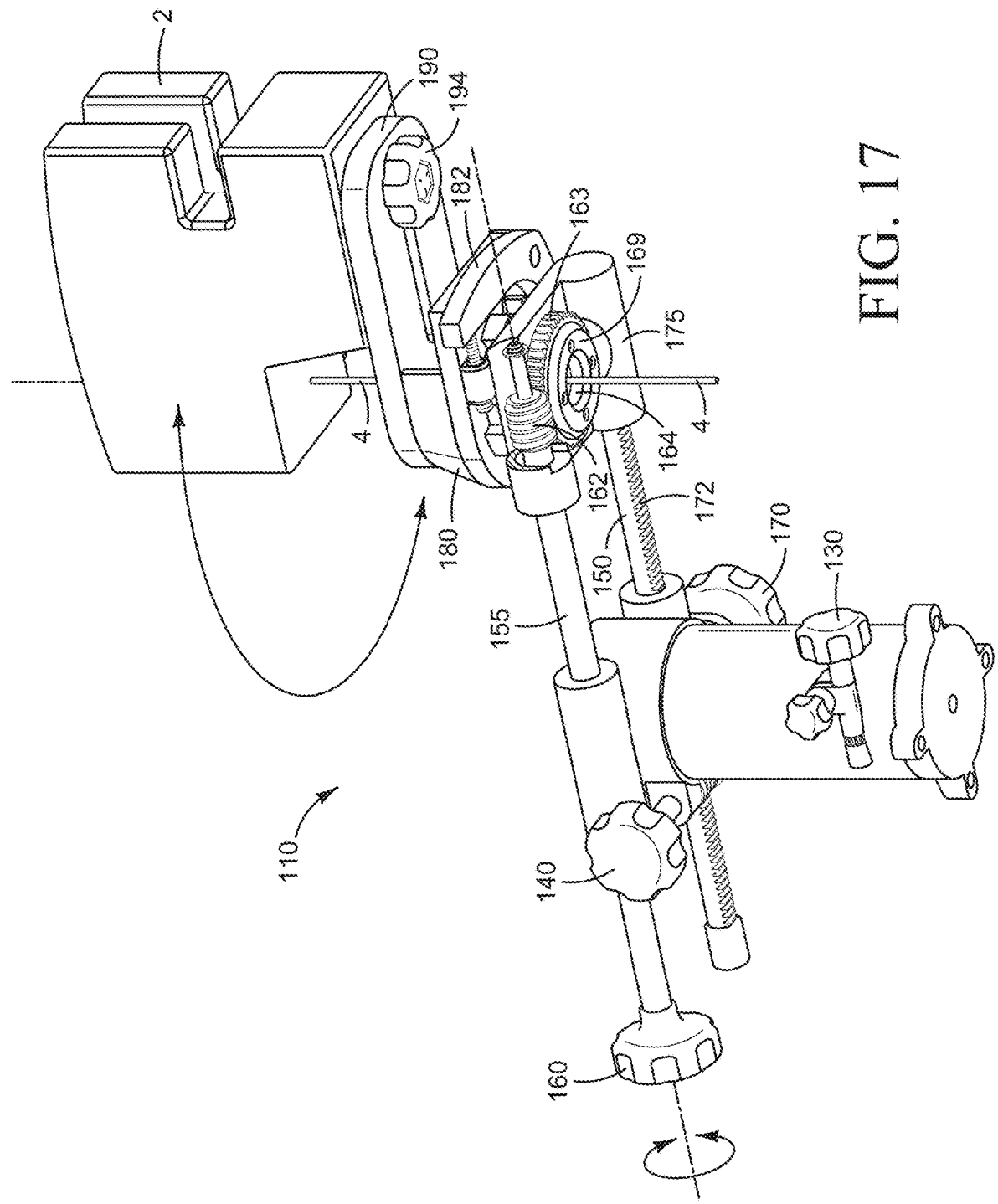
FIG. 17 is a lower perspective partial section view of the exemplary mount assembly of FIG. 12, with the laser unit.
Figure 18:
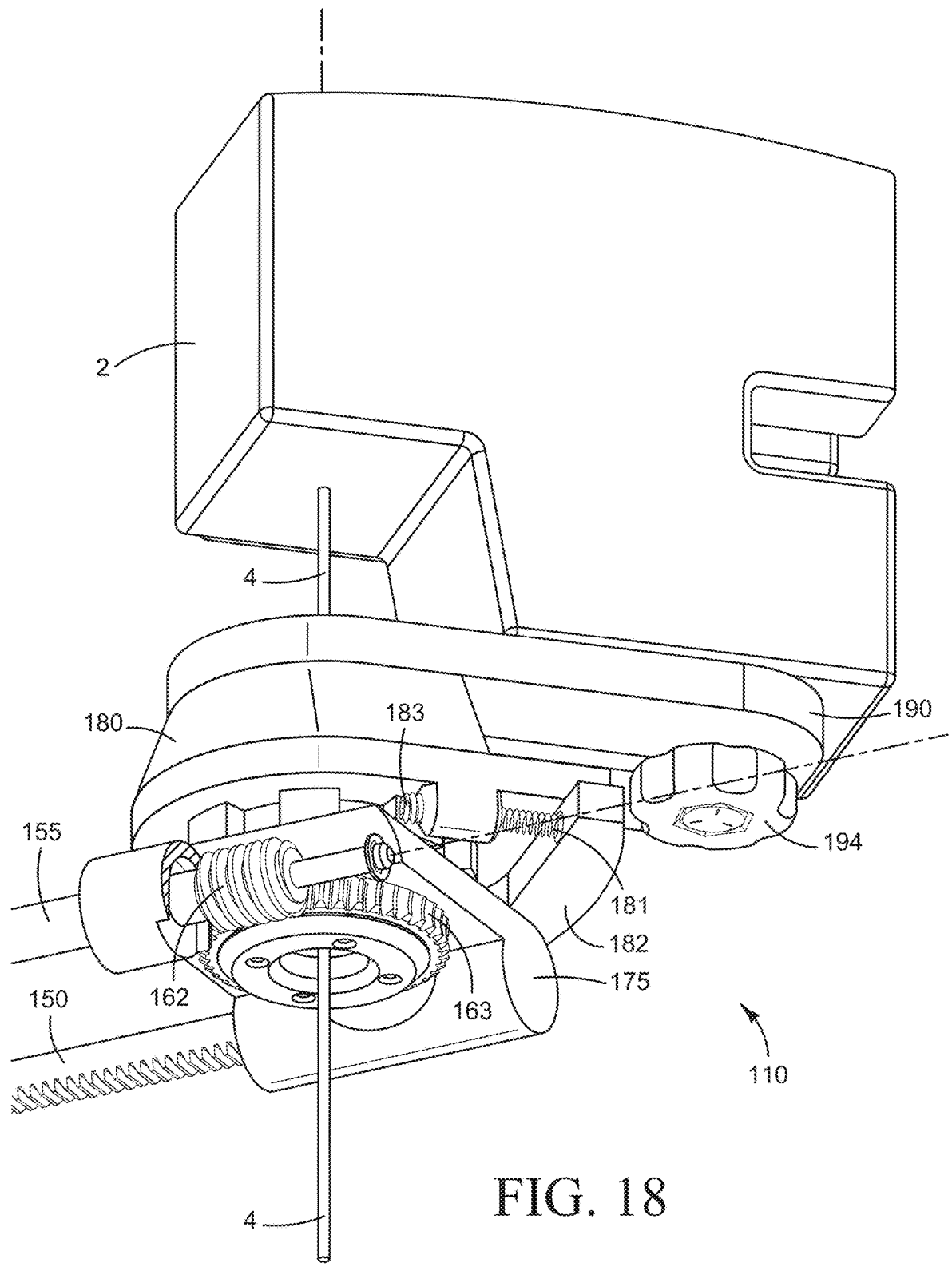
FIG. 18 is a lower perspective partial section view of the exemplary mount assembly of FIG. 12, with the laser unit.
Figure 19:
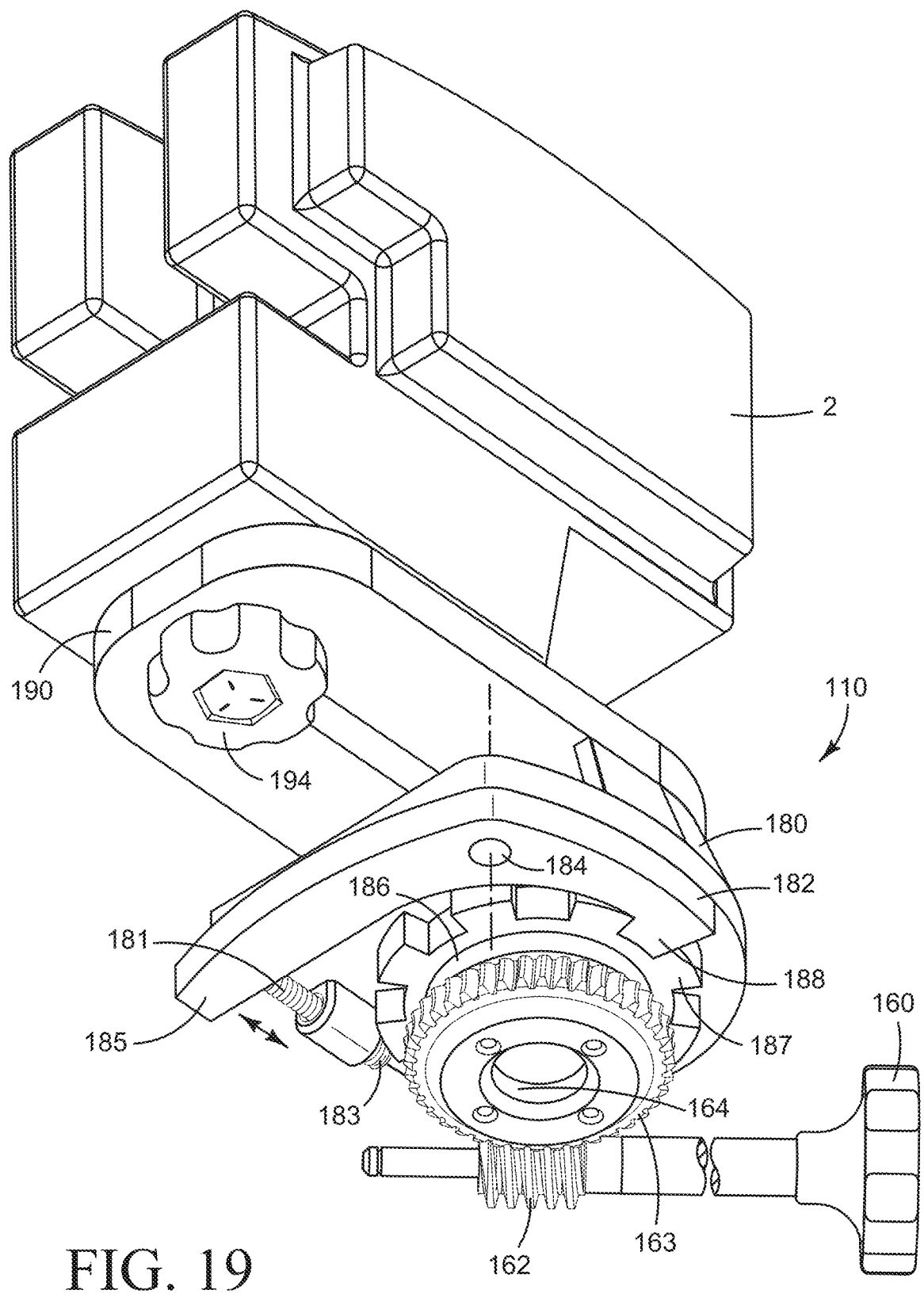
FIG. 19 is a lower perspective partial section view of the exemplary mount assembly of FIG. 12, with the laser unit.
Figure 20:
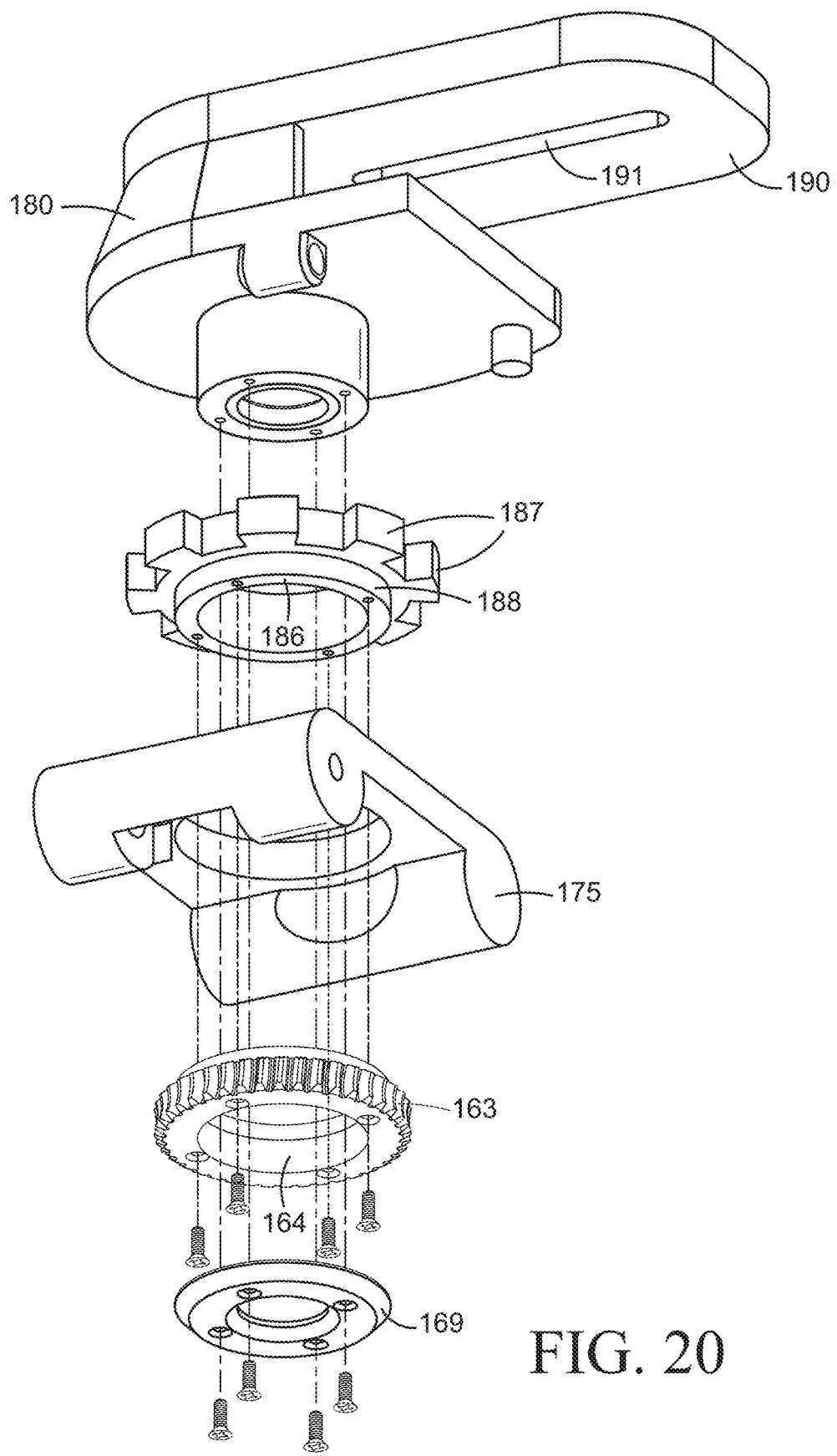
FIG. 20 is a lower perspective exploded view of the exemplary mount assembly of FIG. 12, without the laser unit.

Referring now to FIGS. 15 and 16, the top end of the sleeve 120 rotationally connects with a connector 124. Sleeve 120 terminating in a wheel gear 143 fixed to the sleeve 120 via a fastener 145 through the hub of the wheel gear 143. The connector 124 comprises a worm gear 142 on a shaft 141 controlled by a wheel 140. Rotation of the wheel 140 in a first direction turns the worm gear 142 in a first direction moving the connector 124 in relationship with the sleeve 120 in a first rotational direction. Rotation of the wheel 140 in a second direction turns the worm gear 142 in a second direction moving the connector 124 in relationship with the sleeve 120 in a second rotational direction.

Extending generally horizontally away from the connector 124 are a first shaft 150 and a second shaft 155, with the first shaft 150 located on a first side of the connector 124 and the second shaft 155 located on an opposite, second side of the connector 124. The first shaft 150 connecting to the first side via a first jacket 127, and the second shaft 155 connecting to the second side via a second jacket 128. In such an arrangement, the rotation of the wheel 140 in a first direction turns the worm gear 142 in a first direction moving the connector 124 (and the attached first shaft 150, second shaft 155, and ultimately the attached mountable device 2) in relationship with the sleeve 120 in a first rotational direction. Rotation of the wheel 140 in a second direction turns the worm gear 142 in a second direction moving the connector 124 (and the attached first shaft 150, second shaft 155, and ultimately the attached mountable device 2) in relationship with the sleeve 120 in a second rotational direction. This rotational movement is movement within the X-Y plane.

Referring now to FIGS. 16 through 20, the first shaft 150 extends through the first jacket 127 and the second shaft 155 extends through the second jacket 128. The first shaft 150 attaches to the carriage 175, and provides stability to the carriage 175. The first shaft 150 and the second shaft 155 terminate at the carriage 175 which supports the receiver 180, the mount 190, and the attached mountable device 2. The opposite end of the first shaft 150 terminates in the end 174, whereas the opposite end of the second shaft 155 terminates in knob 160. The mount assembly may include a second Z-axis rotator 165, the second Z-axis rotator 165 configured for rotational movement of the mount assembly in an axis parallel to the Z-axis.

The first shaft 150 having a bottom edge comprising a rack 172. The first jacket 127 further comprises a pinion gear 173 on a shaft 171 extending to a knob 170. The pinion gear 173 intermeshing with the rack 172 so that rotation of the knob 170 in a first direction rotates the shaft 171 and the attached pinion gear 173 in a first direction, causing the first shaft 150 and the second shaft 155, which are connected together at the carriage 175, to move in a first direction away from the connector 124. Further, rotation of the knob 170 in a second direction rotates the shaft 171 and the attached pinion gear 173 in a second direction, causing the first shaft 150 and the second shaft 155, which are connected together at the carriage 175, to move in a second direction towards the connector 124. This movement representing movement along the Y-axis.

Rotation of knob 160 rotates a shaft 155 which rotates a worm gear 162 on the distal end of the shaft 155. The distal end of the shaft 155 rotationally mounted within the carriage 175. The worm gear 162 configured for engaging a wheel gear 163 having a hub 164. The wheel gear 163 mounted to the carriage 175 via a cover 169.

Rotation of knob 160 in a first direction rotates a shaft 155 which rotates a worm gear 162 on the distal end of the shaft 155 in a first direction, resulting in the receiver 180 attaching to the mount 190, and an attached mountable device 2, rotating around the Z-axis defined by laser beam 4 in a first direction. Rotation of knob 160 in a second direction rotates a shaft 155 which rotates a worm gear 162 on the distal end of the shaft 155 in a second direction, resulting in the receiver 180 attaching to the mount 190, and an attached mountable device 2 rotating around the Z-axis defined by laser beam 4 in a second direction.

Such movement around the Z-axis can alternatively be done manually, by depressing a spring 181 loaded lever arm 185 which pivots at a pivot 184 and extends to a pawl 182, the pawl 182 configured for ratcheting receipt in a plurality of notches 187 defined in a ratchet wheel 188. In such an configuration, once the lever arm 185 is depressed, the mountable device 2 (attached to the mount 190 (by threaded screw 194 through slot 191) which is supported by the receiver 180) can be manually rotated the desired number of degrees around the Z-axis. Once the desired rotation is achieved, the lever arm 185 could be released, and the spring 181 (adjustable by a set screw 183) would raise the lever arm 185, resulting in the pawl 182 ratcheting into the adjacent notch 187 of the ratchet wheel 188. The notches 187 in the ratchet wheel 188 are preferably spaced at predefined degree orientations, for instance in 45 degree increments.

Figure 21:
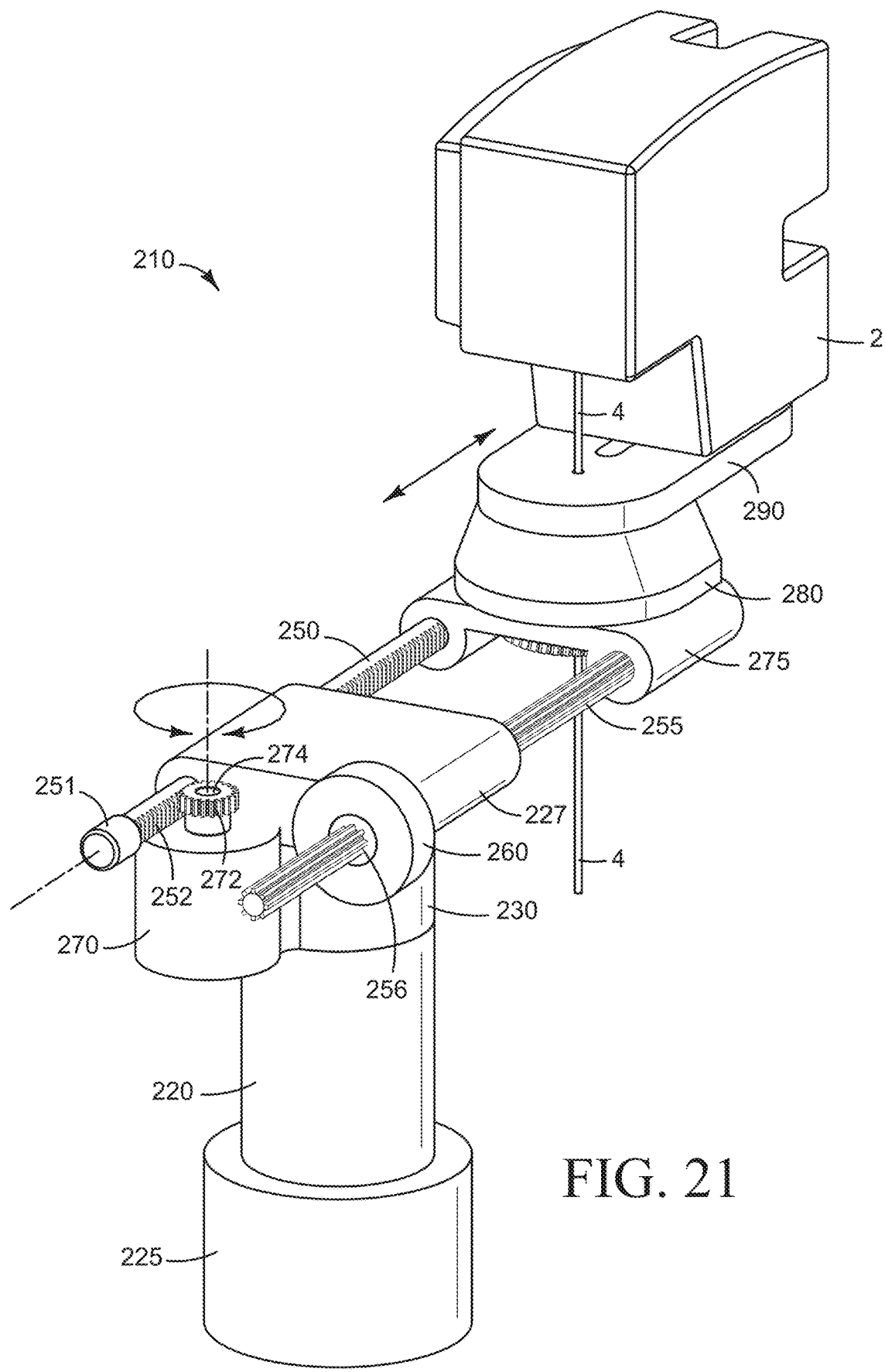
FIG. 21 is an upper isometric view of the third exemplary mount assembly attached to a laser unit.
Figure 22:
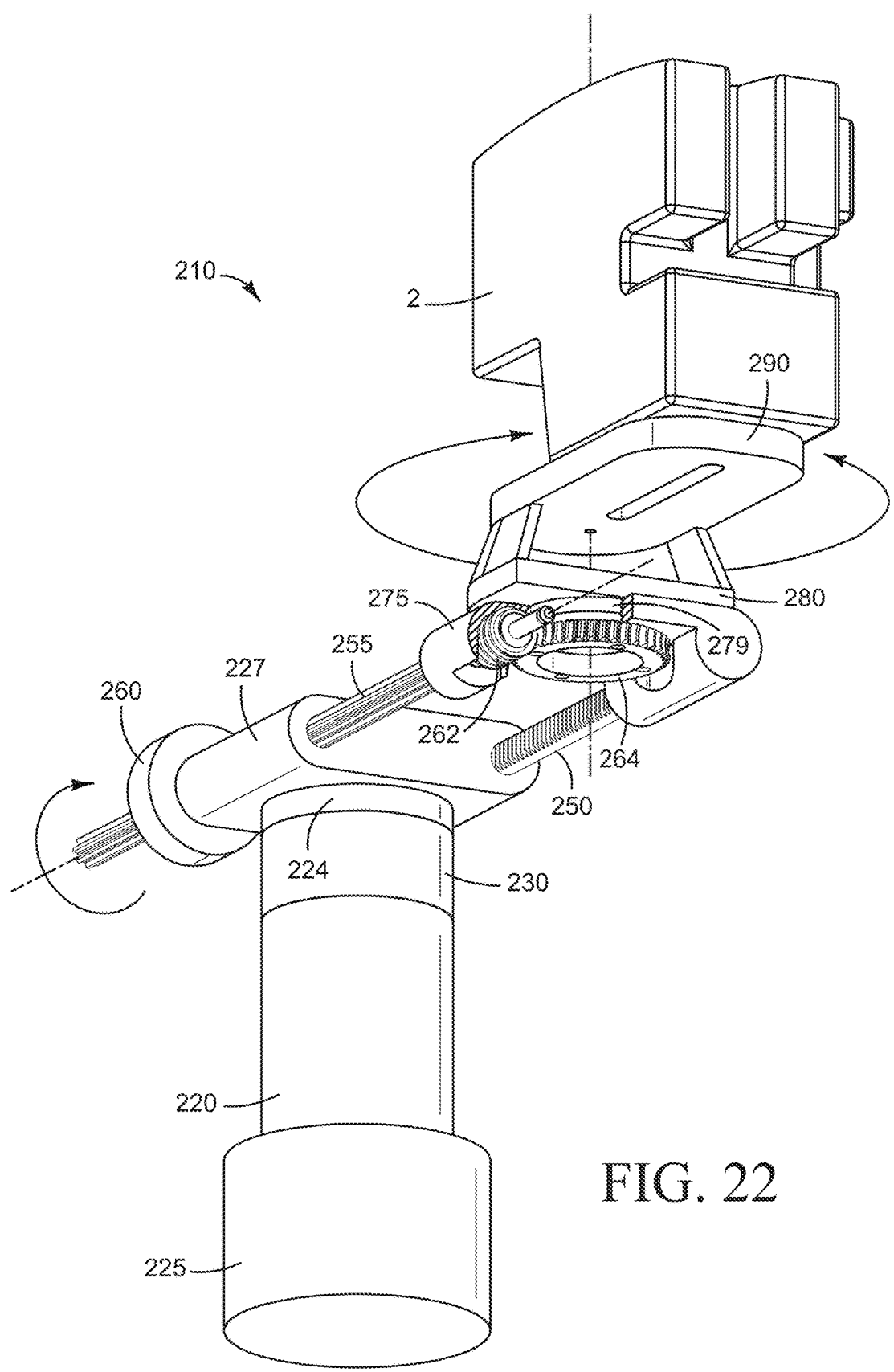
FIG. 22 is a lower isometric view of the third exemplary mount assembly of FIG. 21, illustrated attached to a laser unit.

Referring now to FIGS. 21 and 22, the third exemplary mount assembly 210 is illustrated. The third exemplary mount assembly 210 is similar to the first exemplary mount assembly 10 and the second exemplary mount assembly 110 illustrated in the prior figures and described above, except as detailed below.

The third exemplary mount assembly 210 includes base 225 configured for resting upon or mounting to a surface. The base 225 can be configured for mounting on a separate foot, or attached to a tripod or commercially manufactured mount, via ¼, 20 screws, or screwed to a horizontal object.

The third exemplary mount assembly 210 further includes a housing 220 for attaching to the base 225. The housing 220 telescopingly receives a sleeve 230 therein, the sleeve 230 configured for telescoping out of the housing 220. An electro-mechanical linear actuator (not illustrated) moves the sleeve 230 vertically relative to the housing 220 and the base 225. One example of a suitable electro-mechanical linear actuator is ball screw jack.

The sleeve 230 rotationally connects to the frame 227 by a connector 224. A second electro-mechanical linear actuator (not illustrated), such as a rack and pinion, could be used to rotate the frame 227 with respect to the sleeve 230.

One or more power sources, such as batteries, can also be housed in the housing 220 or base 225, as could other electrical components, such as power supplies, microcontrollers, memory, wireless receiver/transmitters, Bluetooth receiver/transmitters and the like.

The top end of the connector 224 comprises a frame 227 for supporting the first shaft 250 and second shaft 255. Attaching to the frame 227 is a first motor 270 for driving a shaft 274. A pinion gear 272 is mounted on the shaft 274. The pinion gear for connecting with a rack 252 defined in the first shaft 250. The first shaft 250 having a first end 251 terminating in a cap and a second end terminating in the carriage 275. The first motor 270, through the rack and pinion, configured for driving the first shaft 250 (connected to the carriage 275) forwards and backwards in a lateral direction.

The top end of the connector 224 further comprises a rotational motor 260, such as a hollow axle servo, through which the first end 254 of the second shaft 255 passes. The second shaft 255 comprises a spline shaft having a plurality of axially extending teeth extending along its length which are configured for engaging with a gear 256 within the motor 260 so that the motor 260 can rotate the second shaft 255 in a first direction and in a second direction.

The connector 224 further comprises a frame 227 for supporting the first shaft 250 and second shaft 255. Attaching to the frame 227 is a first motor 270 for driving a shaft 274. A pinion gear 272 is mounted on the shaft 274. The pinion gear for connecting with a rack 252 defined in the first shaft 250. The first shaft 250 having a first end 251 terminating in a cap and a second end terminating in the carriage 275. The first motor 270, through the rack and pinion, configured for driving the first shaft 250 (connected to the carriage 275) forwards and backwards in a lateral direction.

The second shaft 255 has a worm gear 262 attached to its second end. The worm gear 262 supported by the carriage 275. The worm gear 262 for engaging with a wheel gear 264 attached to the receiver 280. The receiver 280 attaching to the mount 290 to which the mountable device 2 attaches, as is done similarly in the second exemplary mount assembly described above. In such an arrangement, the rotation of the motor 260 of the second shaft 255 in a first direction turns the worm gear 262 in a first direction resulting in the receiver 280 attaching to the mount 290, and an attached mountable device 2, rotating around the Z-axis defined by laser beam 4 in a first direction. Rotation of the motor 260 in a second direction rotates the second shaft 255 which rotates a worm gear 262 in a second direction resulting in the receiver 280 attaching to the mount 290, and an attached mountable device 2 rotating around the Z-axis defined by laser beam 4 in a second direction.

Further exemplary mount assemblies could be created by combining one or more features, elements, or components of the first exemplary mount assembly 10, the first exemplary mount assembly 110, and/or the third exemplary mount assembly 210.

As discussed herein, when the mountable device is mounted on the mount, the mountable device can be manipulated in many different degrees of motion. The degrees of motion discussed herein are relative to the mountable device as mounted on the mount, and are not necessarily relative to the then current orientation of the mountable device relative to the ground or another surface.

The first degree of motion is linear movement along the X-axis. X-axis motion is preferably accomplished through use of a linear actuator. For instance, a rack and pinion whereby a shaft terminating in a knob is attached to a circular (pinion) gear which engages teeth on a linear gear bar (rack). Rotation of the knob in a first direction rotates the pinion in a first direction, and moves the mountable device forward along the X-axis, and when the knob is rotated in a second direction, the pinion is rotated in a second direction and the mountable device is moved backwards along the X-axis. A skilled artisan will be able to select an appropriate structure and material for the linear actuator in a particular embodiment based on various considerations, including the intended use of the mountable device leveling mount, the intended arena within which the mountable device leveling mount assembly will be used, and the equipment and/or accessories with which the mountable device leveling mount assembly is intended to be used, among other considerations. Further the linear actuator can be mechanically actuated, or can be electronically actuated, for instance through a connection with an input device (e.g., a button, a sensor, a mobile device wirelessly connected to the linear actuator).

The second degree of motion is linear movement along a Y-axis, also preferably accomplished through use of a linear actuator. For instance, a rack and pinion whereby a shaft terminating in a knob is attached to a circular (pinion) gear which engages teeth on a linear gear bar (rack). Rotation of the knob in a first direction rotates the pinion in a first direction, and moves the mountable device in a first direction (e.g., left) along the Y-axis, and when the knob is rotated in a second direction, the pinion is rotated in a second direction and the mountable device is moved in a second direction (e.g., right) along the Y-axis. A skilled artisan will be able to select an appropriate structure and material for the linear actuator in a particular embodiment based on various considerations, including the intended use of the mountable device leveling mount, the intended arena within which the mountable device leveling mount assembly will be used, and the equipment and/or accessories with which the mountable device leveling mount assembly is intended to be used, among other considerations. Further the linear actuator can be mechanically actuated, or can be electronically actuated, for instance through a connection with an input device (e.g., a button, a sensor, a mobile device wirelessly connected to the linear actuator).

The third degree of motion can be linear movement (upwards and downwards) along the Z-axis, also preferably accomplished through use of a linear actuator such as a screw jack. For instance, a screw jack utilizing a lifter nut held in an assembly, where the lifter nut is turned to raise or lower a lifting screw extending therethrough.

This allows the user to move the horizontal beam of the mountable device move vertically up or down. A skilled artisan will be able to select an appropriate structure and material for the linear actuator in a particular embodiment based on various considerations, including the intended use of the mountable device leveling mount, the intended arena within which the mountable device leveling mount assembly will be used, and the equipment and/or accessories with which the mountable device leveling mount assembly is intended to be used, among other considerations. Further the linear actuator can be mechanically actuated, or can be electronically actuated, for instance through a connection with an input device (e.g., a button, a sensor, a mobile device wirelessly connected to the linear actuator).

The fourth degree of motion is a fixed increment rotation around the Z-axis (aka "Z-axis Rotation"). Z-axis Rotation can be used to align the plumb projection onto the second mark. Once this is done, the fixed Z-axis rotation is used to rotate the Laser and project a line either 90 degrees to either side of the initial projected line, or 180 degrees in the other direction. This degree of motion assists in manipulating the mountable device line or dot that indicates level. This manipulates the devices vertical or plumb projection in the aforementioned fixed units, or for projecting a level line in different directions at the same height.

The fifth degree of motion can be rotational movement around the Z-axis, preferably accomplished through use of a worm drive whereby a worm meshes with a worm gear, whereby a shaft terminating in a knob is attached to a worm drive which engages teeth the worm gear so that rotation of the shaft in a first direction moves the mountable device upwards, and whereby rotation of the shaft in a second direction moves the mountable device downwards.

The sixth degree of motion is a first movement of the sloper unit. This movement is in the Y-axis. This movement manipulates the vertical and horizontal lines up to 45 degrees.

The seventh degree of motion is a second movement of the sloper unit. This movement rotation of the sloper unit in the X direction. This movement manipulates the horizontal line, tilting the plane of that line.

Other degrees of motion are possible.

First Use Example: The goal is to align the mountable device's plumb project line with a mark on a vertical surface. To do this, the mountable device/mount assembly would be set so that the mountable device's plumb line is roughly pointed at the mark on the vertical surface. The Z-axis knob would then be rotated until the mountable device's plumb line is on the desired mark and the projection cast up and down the vertical surface.

Second Use Example: The goal is to align the laser of the mountable device with two (2) marks on a floor. A user places the mountable device/mount assembly to roughly align the mountable device's plumb line with the two (2) marks. Then, using a combination of the X-axis motion and the Z-axis rotation, the user brings the projected beam onto the two (2) marks. Further, the X-axis is roughly aligned perpendicular to the two marks.

Third Use Example: The goal is to align the mountable device directly over a known point and project it onto a second. A user places the mountable device/mount assembly roughly over the known point and roughly points the laser of the mountable device at the second point. With a simple plumb and level line mountable device, centering over the mark is accomplished before the mountable device is mounted on the mount assembly by sighting down the hollow axle and centering the mark in the sights in that axle, then attaching the mountable device to the mount 26. With a mountable device that projects up and down dots, a user centers the dots in the middle of the hollow axle first. The user then uses the X-axis and Y-axis knob to center the mountable device over the known point. The Z-axis rotation can then be used to align the plumb projection onto the second mark.

Fourth Use Example: The goal is to align the mountable device over a known point, project a plumb line to a second mark, and then create a plumb line perpendicular to that first line. A user places the mount assembly roughly over the known point, and roughly points the laser of the mountable device at the second point. With a simple plumb and level line mountable device, this is accomplished before the mountable device is mounted on the mount, by sighting down the hollow axle and centering the mark in the sights in that axle. With a mountable device that projects up and down dots, the user centers the dots in the middle of the hollow axle before use. The user then uses the X-axis and Y-axis knob to center the mountable device over the known point. The Z-axis rotation can then be used to align the plumb projection onto the second mark. Once this is done, the fixed increment Z-axis rotation is used to rotate the mountable device and project a line either 90° to either side of the initial projected line, or 180° in the other direction. In use, the fixed increment Z-axis rotation can be used to project a level line quickly around a room?

These Use Examples are merely example uses and are not intended to provide all possible uses of the mount.

In another exemplary mount assembly, in a cross vice version, the mount assembly has the Z-axis travel (not rotation) placed between the x-axis actuator and y-axis actuator. This would give the unit more stability, and would reduce complications at the out board end of the extension arm.

Distance indicia referred to herein could be any desired measurement scale, including, but not limited to, millimeters and fractions of an inch. Rotation indicia referred to herein could include degrees or any others units of measurement.

The foregoing detailed description provides exemplary embodiments of the invention and includes the best mode for practicing the invention. The description and illustration of these embodiments is intended only to provide examples of the invention, and not to limit the scope of the invention, or its protection, in any manner.

What is claimed is:

1. A mount for a laser unit device, the mount comprising:
a base, an X-axis linear actuator, a support assembly, a Z-axis rotator, a vertical spacer, and a mount assembly;
the base comprising a body portion, the body portion having a length defined between a first side and a second side, the body portion defining an X-axis along the length;
the X-axis linear actuator connecting between the body portion and the support assembly, the X-axis linear actuator configured for straight-line movement along the X-axis;
an upright support of the support assembly having a support upper end and a support lower end, the support lower end connected to the X-axis linear actuator, the support upper end connected to the Z-axis rotator;
the Z-axis rotator connecting the support assembly to the vertical spacer, the Z-axis rotator configured for rotation of the vertical spacer relative to a Z-axis, the Z-axis perpendicular to the X-axis;
the vertical spacer having a vertical spacer first end extending to a vertical spacer second end, the vertical spacer supporting the mount assembly; and
the mount assembly comprising a platform configured for supporting the laser unit device, the mount assembly attaching to the vertical spacer.

2. The mount of claim 1, further comprising a Z-axis linear actuator connecting between the support assembly and the vertical spacer, the Z-axis linear actuator configured for straight-line movement along the Z-axis, wherein straight-line movement of the Z-axis linear actuator along the Z-axis moves the vertical spacer in the Z-axis relative to the body portion.

3. The mount of claim 2,
wherein the support assembly defines a vertical connector configured for engaging with the Z-axis linear actuator, the vertical connector having a top opening and a bottom opening defining a vertical passageway therebetween;
wherein the vertical spacer comprises threading on an outside surface and the Z-axis rotator comprises an internally threaded lifter nut configured for receipt into the vertical connector;
wherein the vertical connector further comprises a horizontal slot therethrough configured for receiving therein the lifter nut;
wherein the vertical spacer can then be inserted into the top opening, threaded through the lifter nut, and extend out of the bottom opening; and
wherein rotation of the lifter nut within the vertical connector moves the vertical spacer relative to the support assembly.

4. The mount of claim 3, wherein rotation of the lifter nut of the Z-axis rotator in a first axial direction causes the vertical spacer to rotate clockwise relative to the support assembly, and wherein rotation of the lifter nut of the Z-axis rotator in a second axial direction causes the vertical spacer to rotate counter-clockwise relative to the support assembly.

5. The mount of claim 2,
wherein the support assembly further comprises a Y-axis linear actuator, an upright support, and an extension arm; and
the Y-axis linear actuator connecting between the upright support and the extension arm, the Y-axis linear actuator configured for moving the extension arm along a Y-axis, the Y-axis perpendicular to the X-axis and perpendicular to the Z-axis.

6. The mount of claim 5,
wherein the base comprises a first mortise configured for engaging a first tenon defined in the lower end of the upright support;
wherein the X-axis linear actuator comprises a rack on the body portion parallel to the first mortise and a pinion on the upright support;

wherein the upright support comprises a second tenon defined in the upper end of the upright support; and wherein the support assembly further comprises a truss, the truss having a length, the truss having a top side and a bottom side, the truss defining a second mortise along the length in the bottom side, the second mortise configured for mating slidable engagement with the second tenon.

7. The mount of claim 6, wherein the pinion comprises a wheel configured for turning by a user;

wherein rotation of the wheel in a first axial direction turns the pinion which travels along the rack in a leftward direction, moving the extension arm in the leftward direction; and wherein turning the wheel in a second axial direction turns the pinion which travels along the rack in a rightward direction, moving the extension arm in a leftward direction and in a rightward direction along the X-axis relative to the base.

8. The mount of claim 5, wherein the support assembly defines a vertical connector configured for engaging with the Z-axis linear actuator, the vertical connector having a top opening and a bottom opening defining a vertical passageway therebetween;

wherein the support assembly further comprises a generally horizontal worm gear extending into the vertical passageway;

wherein the vertical passageway comprising a spring catch ledge configured for engaging a spring catch on a carriage;

wherein the carriage comprising an external gear wheel configured for engaging the worm gear;

wherein the carriage further comprising a pair of opposing equiradially disposed keys; and wherein the keys configured for receipt into mating equiradially disposed slots defined on the vertical spacer.

9. The mount of claim 8, wherein the worm gear further comprises a worm gear knob configured for turning by a user;

wherein turning the worm gear knob in a first rotational direction turns the worm gear in the first rotational direction which causes the opposing equiradially disposed keys to engage the mating equiradially disposed slots and causes rotation of the vertical spacer in a second rotational direction relative to the Z-axis; and wherein turning the worm gear knob in a third rotational direction turns the worm gear in the third rotational direction which causes the opposing equiradially disposed keys to engage the mating equiradially disposed slots and rotates the vertical spacer in a fourth rotational direction relative to the Z-axis.

10. The mount of claim 9, wherein the gear wheel further comprises an indicator and an indexed slip ring for enabling a user to determine degrees of rotation relative to the Z-axis.

11. The mount of claim 1, wherein straight-line movement of the X-axis linear actuator in a first lateral direction along the X-axis moves the support assembly in the first lateral direction relative to the body portion, and wherein straight-line movement of the X-axis linear actuator in a second lateral direction along the X-axis moves the support assembly in the second lateral direction relative to the body portion.

12. A mount for a laser unit device, the mount comprising:

a base, an X-axis linear actuator, a support assembly, a Z-axis rotator, a vertical spacer, a Z-axis linear actuator, and a mount assembly;

the base comprising a body portion, the body portion having a length defined between a first side and a second side, the body portion defining an X-axis along the length, the body portion having a bottom side configured for resting upon a surface;

the X-axis linear actuator connecting between the body portion and the support assembly, the X-axis linear actuator configured for straight-line movement along the X-axis, wherein straight-line movement of the X-axis linear actuator in a first lateral direction along the X-axis moves the support assembly in the first lateral direction relative to the body portion, and wherein straight-line movement of the X-axis linear actuator in a second lateral direction along the X-axis moves the support assembly in the second lateral direction relative to the body portion;

the support assembly having a support upper end and a support lower end, the support lower end connected to the X-axis linear actuator, the support upper end connected to the Z-axis rotator;

the Z-axis rotator connecting the support assembly to the vertical spacer, the Z-axis rotator configured for rotation of the vertical spacer relative to a Z-axis, the Z-axis perpendicular to the X-axis;

the vertical spacer having a vertical spacer first end extending to a vertical spacer second end, the vertical spacer connecting between the Z-axis linear actuator and the mount assembly;

the Z-axis linear actuator connecting between the support assembly and the vertical spacer, the Z-axis linear actuator configured for straight-line movement along the Z-axis, wherein straight-line movement of the Z-axis linear actuator along the Z-axis moves the vertical spacer in the Z-axis relative to the body portion; and the mount assembly comprising a platform configured for supporting the laser unit device, the mount assembly attaching to the vertical spacer.

13. The mount of claim 12, wherein the support assembly defines a vertical connector configured for engaging with the Z-axis linear actuator, the vertical connector having a top opening and a bottom opening defining a vertical passageway therebetween, the vertical connector further comprising a horizontal slot therethrough configured for receiving therein a lifter nut, and wherein the vertical spacer comprises threading on an outside surface of the vertical spacer and the Z-axis rotator comprises an internally threaded section of the lifter nut configured for receipt into the vertical connector;

wherein rotation of the lifter nut of the Z-axis rotator in a first axial direction causes the vertical spacer to rotate clockwise relative to the support assembly, and wherein rotation of the lifter nut of the Z-axis rotator in a second axial direction causes the vertical spacer to rotate counter-clockwise relative to the support assembly;

wherein the vertical spacer can then be inserted into the top opening, threaded through the lifter nut, and extend out of the bottom opening; and wherein rotation of the lifter nut within the vertical connector moves the vertical spacer relative to the support assembly.

14. The mount of claim 12,
wherein the support assembly further comprises a Y-axis linear actuator, an upright support, and an extension arm;
wherein the support assembly defines a vertical connector configured for engaging with the Z-axis linear actuator, the vertical connector having a top opening and a bottom opening defining a vertical passageway therebetween;
wherein the extension arm further comprises a generally horizontal worm gear extending into the vertical passageway;
wherein the vertical passageway comprising a spring catch ledge configured for engaging a spring catch on a carriage;
wherein the carriage comprising an external gear wheel configured for engaging the worm gear;
wherein the carriage further comprising a pair of opposing equiradially disposed keys; and
wherein the keys configured for receipt into mating equiradially disposed slots defined on the vertical spacer.

15. The mount of claim 12,
wherein the support assembly further comprises a Y-axis linear actuator, an upright support, and an extension arm;
wherein the Y-axis linear actuator connecting between the upright support and the extension arm, the Y-axis linear actuator configured for moving the extension arm along a Y-axis, the Y-axis perpendicular to the X-axis and perpendicular to the Z-axis;
wherein the base comprises a first mortise configured for engaging a first tenon defined in the upright support lower end;
wherein the upright support comprises a second tenon; and
wherein the support assembly further comprises a truss, the truss having a length, the truss having a top side and a bottom side, the truss defining a second mortise along the length in the bottom side, the second mortise configured for mating slidable engagement with the second tenon.

16. The mount of claim 15,
wherein the X-axis linear actuator comprises a rack on the body portion parallel to the first mortise and a pinion on the upright support;
wherein the pinion comprises a wheel configured for turning by a user;
wherein rotation of the wheel in a first axial direction turns the pinion which travels along the rack in a leftward direction, moving the extension arm in the leftward direction; and
wherein turning the wheel in a second axial direction turns the pinion which travels along the rack in a rightward direction, moving the extension arm in a leftward direction and in a rightward direction along the X-axis relative to the base.

17. The mount of claim 12,
wherein the vertical spacer comprises a screw jack,
wherein the screw jack comprises a lifter nut for rotation by a user and a lifting screw;
wherein the lifter nut comprises an internal hub; and
wherein the internal hub of the lifter nut is internally threaded for driving the lifting screw, so that rotation of the lifter nut in a first axial direction causes the lifting screw to advance in an upwards direction away from the base, and rotation of the lifter nut in a second axial direction cause the lifting screw to advance in a downwards direction towards the base.

18. A mount for a laser unit device, the mount comprising:
a base, a support assembly, a Z-axis rotator, a horizontal spacer, a Z-axis linear actuator, and a mount assembly;
the base comprising a body portion, the body portion having a bottom side configured for resting upon a surface;
the support assembly comprising:
an upper portion, the upper portion connected to the Z-axis rotator; and
a lower portion, the lower portion slidingly connected to the upper portion, the lower portion connecting to the base; and
a Z-axis linear actuator, the Z-axis linear actuator connecting between the upper portion and the lower portion, the Z-axis linear actuator configured for straight-line movement of the upper portion relative to the Z-axis;
the Z-axis rotator connecting the support assembly to the horizontal spacer, the Z-axis rotator configured for rotation of the horizontal spacer relative to the lower portion;
the horizontal spacer connecting between the Z-axis rotator and the mount assembly, wherein the horizontal spacer further comprises a horizontal linear actuator, the horizontal linear actuator configured for straight-line movement along an axis perpendicular to the Z-axis, wherein straight-line movement of the horizontal linear actuator in a lateral direction moves the mount assembly in the lateral direction relative to the support assembly; and
the mount assembly comprising a platform configured for supporting the laser unit device.

19. The mount of claim 18, wherein the mount assembly further comprises a second Z-axis rotator, wherein the second Z-axis rotator is configured for rotational movement of the mount assembly in an axis parallel to the Z-axis.

* * * * *